(12) United States Patent
Claridge Huggins

(10) Patent No.: US 10,197,287 B1
(45) Date of Patent: Feb. 5, 2019

(54) FOAM FORM FOR WOOD FIRED OVEN

(71) Applicant: Catherine Claridge Huggins, Lynden, WA (US)

(72) Inventor: Catherine Claridge Huggins, Lynden, WA (US)

( * ) Notice: Subject to any disclaimer, the term of this patent is extended or adjusted under 35 U.S.C. 154(b) by 0 days.

(21) Appl. No.: 14/297,591

(22) Filed: Jun. 5, 2014

Related U.S. Application Data

(63) Continuation-in-part of application No. 29/432,630, filed on Sep. 18, 2012, now abandoned, and a continuation-in-part of application No. 13/862,069, filed on Apr. 12, 2013, now abandoned.

(60) Provisional application No. 61/635,515, filed on Apr. 19, 2012.

(51) Int. Cl.
| | |
|---|---|
| *B29C 39/26* | (2006.01) |
| *F24B 3/00* | (2006.01) |
| *E04B 1/00* | (2006.01) |
| *B22D 7/06* | (2006.01) |

(52) U.S. Cl.
CPC ............... *F24B 3/00* (2013.01); *B29C 39/26* (2013.01); *E04B 1/00* (2013.01); *B22D 7/06* (2013.01)

(58) Field of Classification Search
CPC ..... F24B 3/00; E04B 1/00; B22D 7/06; B29C 39/26
USPC ....... 249/164, 165, 168, 174, 194, 192, 193, 249/209, 212
See application file for complete search history.

(56) References Cited

U.S. PATENT DOCUMENTS

| | | | | |
|---|---|---|---|---|
| 1,252,093 | A * | 1/1918 | Davidson | E21D 11/102 249/11 |
| 1,424,342 | A * | 8/1922 | Compton | F16L 1/038 249/209 |
| 4,702,224 | A * | 10/1987 | Griffith | A47J 37/06 126/25 R |
| 6,010,276 | A * | 1/2000 | Young | E01F 1/00 249/219.1 |
| 6,408,576 | B1 * | 6/2002 | Roth | B28B 7/0038 249/209 |
| 6,615,818 | B1 * | 9/2003 | Jimka | F24B 1/18 126/25 R |
| 6,748,939 | B1 * | 6/2004 | Gober | A47J 37/0704 126/25 R |
| 7,950,872 | B2 * | 5/2011 | Radu, Jr. | E01F 1/00 249/160 |
| 2005/0087908 | A1 * | 4/2005 | Nasr | B29C 39/02 264/255 |
| 2006/0059859 | A1 * | 3/2006 | Knerr | E04G 21/1841 52/749.13 |
| 2006/0197257 | A1 * | 9/2006 | Burt | B29C 37/0032 264/255 |
| 2007/0221191 | A1 * | 9/2007 | O'Brien | F24B 1/20 126/25 R |
| 2007/0227087 | A1 * | 10/2007 | Nasr | B29C 37/0032 52/314 |
| 2009/0056257 | A1 * | 3/2009 | Mollinger | B29C 37/0032 52/314 |

(Continued)

*Primary Examiner* — Seyed Masoud Malekzadeh
(74) *Attorney, Agent, or Firm* — Paul B. Heynssens Attorney at Law, PLC

(57) ABSTRACT

A masonry oven constructed with the aid of molds. An exemplary foam mold set for the on-site for the construction of a pizza oven. The mold set allows do-it-yourself homeowners, construction companies and the like to construct a custom pizza oven by simply applying fire bricks and high temperature mortar to the outer surface of the mold.

8 Claims, 29 Drawing Sheets

(56) References Cited

U.S. PATENT DOCUMENTS

2009/0062413 A1* 3/2009 Adur .................. B29C 37/0032
521/157
2009/0062431 A1* 3/2009 Nasr .................. B29C 37/0032
524/8

* cited by examiner

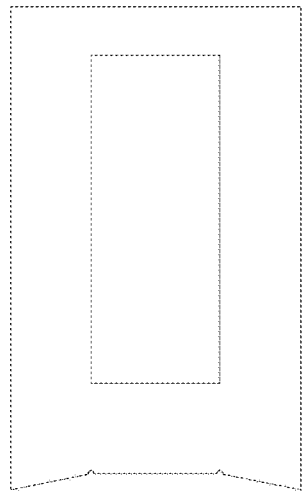  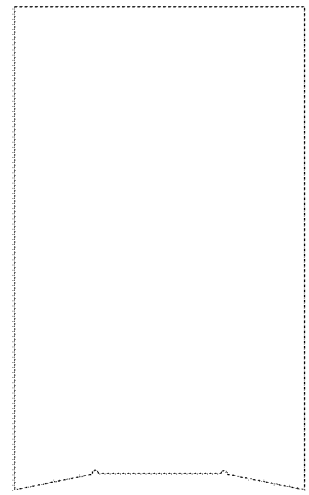
Fig. 36          Fig. 37          Fig. 38
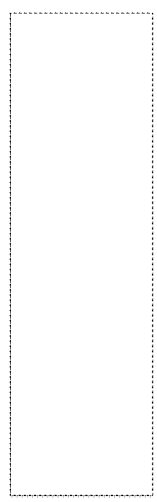  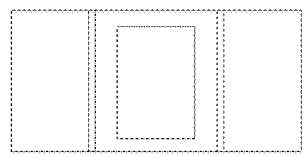
Fig. 40
Fig. 39          Fig. 41

FOAM FORM FOR WOOD FIRED OVEN

CROSS-REFERENCE TO RELATED APPLICATIONS

This is a continuation-in-part of application Ser. No. 29/432,630, filed Sep. 18, 2012, the subject matter of which is incorporated herein by reference.

TECHNICAL FIELD

This description relates generally to masonry construction and more specifically to construction of masonry ovens for consumer use.

BACKGROUND

A masonry oven, also known as a brick or stone oven, is an oven including a baking chamber in which a fire is lit. Though traditionally wood-fired, coal-fired, natural gas fired or even electricity fired ovens are possible. Modern masonry ovens are often associated with artisanal bread and pizza, but in the past they were used for any cooking task involving baking. These ovens are often built by a skilled mason and therefore typically expensive to the point where people usually do not have them in their homes or in an outdoor barbeque area.

FIG. 1 shows a typical oven being hand built from brick. A concrete or masonry floor 100 is constructed and each course of brick 102, 104, 106, 108, 110 is laid up and allowed to set sufficiently before the next course is added. Alternatively an oven can be cast from concrete. However, a mold for such a casting is often constructed on site, and is another costly and time consuming structure to build. The mason maintains the circular shape of this oven with a compass like device 112, which similar to a plumb line for vertical surfaces, allows the mason to maintain the shape of each course as a circle and each course being in reduced diameter to form a dome. Needless to say, such a brick by brick process is expensive and time consuming to construct. And, if not done by a skilled mason the result can be an oven that does not heat properly, and that may be less than pleasing to look at.

The direct-fired masonry oven is often called a "Roman" or "black" oven, because of its origin. It is called a black oven because the smoke from the wood used as fuel sometimes collects as soot on the roof of the oven. As previously stated masonry ovens are not easy to construct, however, the ovens were in wide use throughout medieval Europe and were often built to serve entire communities, where the owners or local governments that built them might charge a fee for their use. Such ovens are still in wide use in artisanal bakeries and pizzerias. Also, in the pre-Columbian Americas, similar ovens, called by the Spanish term hornos, were often made of clay or adobe. This construction technique has been used since antiquity, and does an excellent job of baking various items. However, modern technology has provided a somewhat satisfactory solution to building a custom built masonry oven.

FIG. 2 shows a table top pizza oven 200 constructed of metal and other modern materials. Such ovens are used in commercial settings, but tend to be expensive, aesthetically unappealing, and they do not store and radiate heat like a masonry oven. However, such an oven may be somewhat light weight, and easy to ship and install. But, many people still prefer bread and pizza that has been cooked in a masonry oven, and may find the modern metal oven a poor substitute for the masonry oven.

People are unable to easily and economically create a pizza oven out of high temperature masonry. Prefabricated ovens, often shipped in pieces, are heavy to ship and expensive. It would be advantageous for a homeowner or consumer to be able to build a pizza oven with a onetime use mold or molds, with far less cost (Do-it-yourself vs. a machine made oven) than a custom built oven to carry out artisan baking in their home or yard. In particular, a mold set that is cost effective to ship that allows oven core assembly to be performed on site and allows easy oven construction without having to deal with the weight of a single cast piece at the job site.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A masonry oven may be constructed with the aid of molds or equivalently prefabricated forms or guides. An exemplary foam mold set to facilitate on site construction of a pizza oven. The mold set allows do-it-yourself homeowners, construction companies and the like to construct a custom pizza oven by simply placing fire bricks and high temperature mortar on the outer surface of the mold to create an oven core, then finishing the assembled oven core.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 36 is the inner surface of the chimney mold with adhesive.

FIG. 37 is the inner surface of the chimney mold without adhesive.

FIG. 38 is the obverse surface of both chimney molds.

FIG. 39 is the side view of the chimney molds.

FIG. 40 is the top view of the chimney molds.

FIG. 41 is the bottom view of the chimney molds.

Like reference numerals are used to designate like parts in the accompanying drawings.

DETAILED DESCRIPTION

Figure 1:
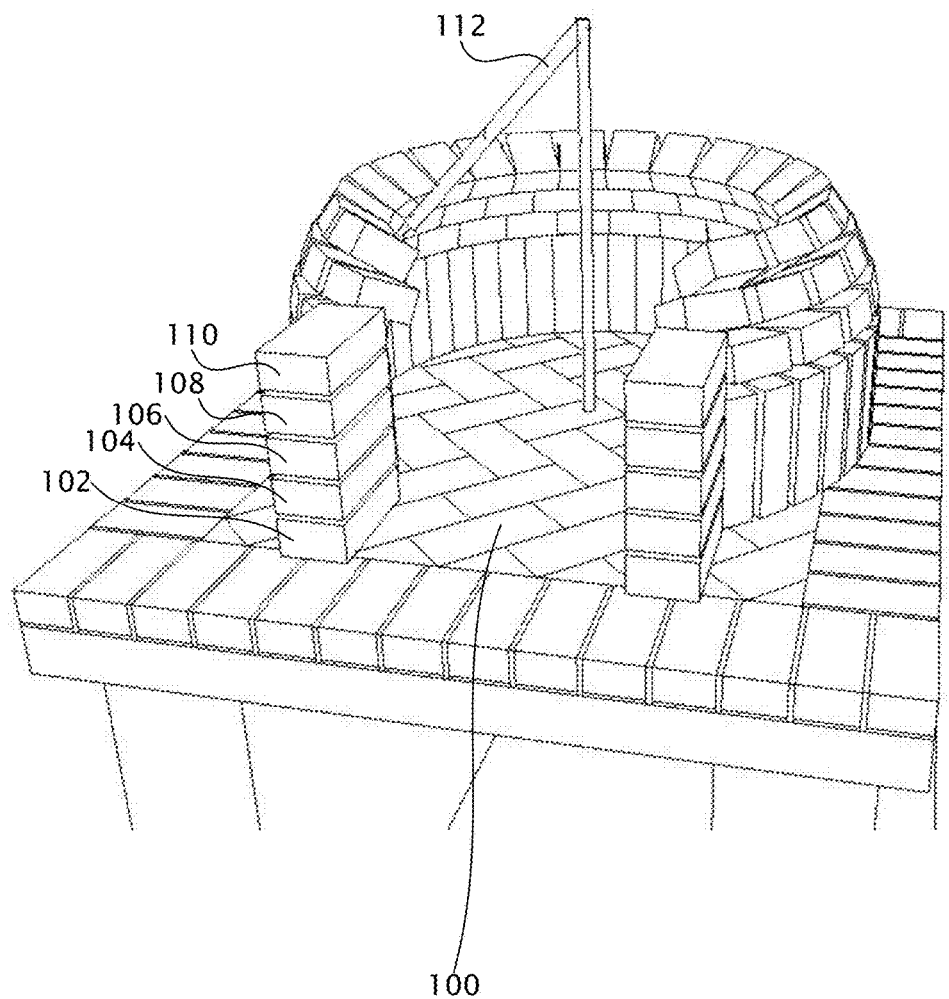
FIG. 1 shows an oven being built from brick.
Figure 2:
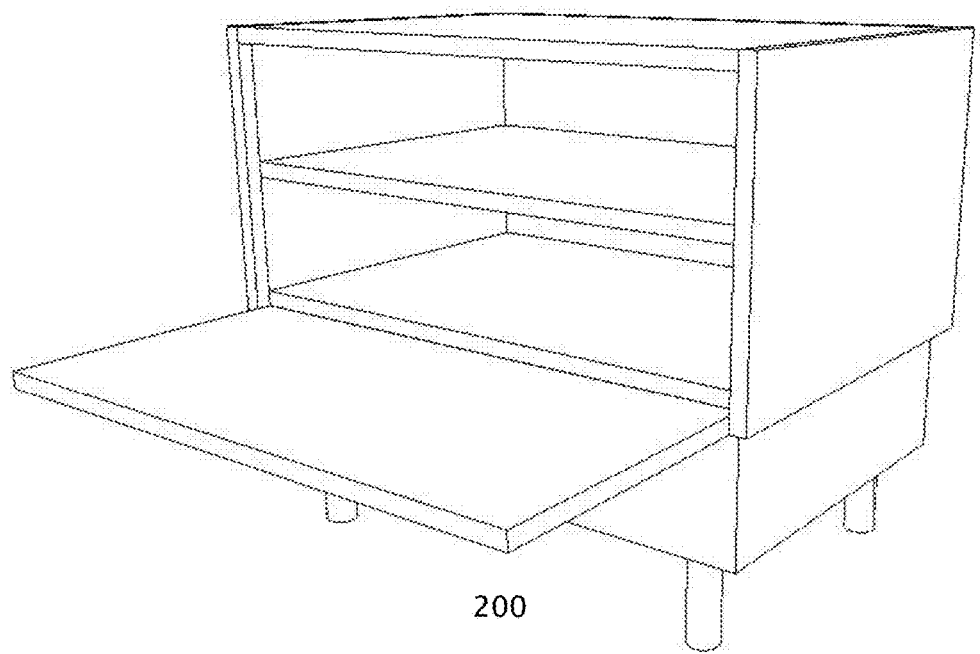
FIG. 2 shows a table top pizza oven constructed of metal and other modern materials.

The detailed description provided below in connection with the appended drawings is intended as a description of the present examples of a masonry (or equivalently "pizza" oven) and is not intended to represent the only forms in which the present example of a site-built masonry oven may be constructed or utilized. The description sets forth the functions of the example and the sequence of steps for constructing and operating the example. However, the same or equivalent functions and sequences may be accomplished by different examples. Dimensions may be shown in some drawings, the dimensions shown are only exemplary and not intended to be limiting, as the oven may be scaled up or down as desired. The proportions are also but exemplary, as other proportions of one component or element may be varied while still maintaining the overall function of the oven for artisan baking.

The problem this invention solves is the ability to have a pizza oven without the high cost, high shipping cost, and typically massive manpower needed to enjoy a pizza oven. The examples described herein gives virtually anyone the ability to make a pizza oven out of a high-temperature masonry products. After building the proper pizza oven base or pedestal for support, the user simply assembles the mold pieces, or forms on top of the cooking surface, which is the top surface of the pedestal. On site, the user applies high temperature bricks and mortar to the outer surface of the mold. Once the mortar is cured, the mold is removed from the cavity formed by the top of the pedestal and the brick/mortar shell of the oven, the bricks and mortar are insulated by the application of an insulative material, which is then covered with a metal lath, wire netting or the like. The lath is covered with stucco or mortar, which is allowed to cure. Subsequently, the stucco may be decoratively finished as desired by the user.

As previously described, people are generally unable to easily create a pizza oven out of brick or cast high temperature concrete. Prefabricated ovens are heavy to ship and expensive. This system creates ovens that look and function like a hand crafted brick-by-brick built oven, but on a onetime use platform resulting in far less cost to produce an aesthetically pleasing and functional oven capable of performing artisan baking at home. The molds, or forms described herein allows do-it-yourself homeowners the ability to make a pizza oven in their own backyard, or wherever, by simply assembling high temperature bricks and mortar to the outer surface of a mold as part of the fabrication process described herein. The guidance, and spacing provided by the use of the mold allows a professional looking result to be obtained.

The examples below describe a masonry pizza oven assembled on site. Although the present examples are described and illustrated herein as being implemented in a pizza oven, the system described is provided as an example and not a limitation. As those skilled in the art will appreciate, the present examples are suitable for application in a variety of different types of oven or baking systems such as for baking artisan breads and other dishes.

Wood-fired pizza ovens such as the examples described herein, use wood fuel for cooking. There are typically two types of wood-fired pizza ovens that the molded oven described herein could be applied to, "black ovens" and "white ovens". The process and mold described herein may advantageously be used in the construction of either type of oven. And in addition, a variety of oven shapes may be created with various mold design that may be used to produce an oven by the methods described herein.

Black ovens are heated by burning wood in the same chamber and the food is cooked alongside the fire while it is still burning. Alternatively, the food is cooked in the heated chamber after the fire and coals have been swept out. A black oven is typically heated just once by burning wood inside the oven chamber. After the coals are raked out, the oven cools over a period of hours. Immediately after a firing, the oven temperature may exceed 1000 degrees Fahrenheit. The mass of the oven acts as a "thermal reservoir", which slowly releases heat over time. The retained heat in the oven may be used to cook multiple batches of bread, or alternatively, foods requiring different temperatures can be cooked in succession as the temperature of the oven slowly drops. This practice maximizes the efficiency of the oven, by fully utilizing the thermal energy stored during the firing process.

White ovens may be heated by heat transfer from a separate combustion chamber and flue-gas path. The cooking chamber of the oven remains "white", or clean from ash. The "white oven" is a somewhat more complex design that pipes heat in from an external firebox without routing the smoke from the fire through the oven.

Hybrid oven designs may combine aspects of both internal and external-fired oven models. The molds and the method of construction described herein may be advantageously applied in the construction of black, white, and hybrid ovens. Generally, a pizza oven is roughly dome or barrel-shaped on the interior (and sometimes on the exterior as well), with the ceiling of the oven constructed as an arch over the baking surface. The exterior may take a variety of shapes, according to the design of the mold. The exterior allows any decorative shape to be provided as a support base for decorative masonry or stone work. The exterior may take a variety of finishes, 300, 302, 304, according to the user's preferences, and the front opening of the oven may be optionally reduced up to 40% in area 304 to improve heat efficiency in the oven. A chimney 316 is provided to help with draft, and a mold allows easy installation of the chimney in an optimal location. If such an oven were built on site, most likely by a mason, a custom built mold from wood or the like would need to be constructed, perhaps without the optimal dimensions. Accordingly, it is difficult and expensive for a consumer to easily create an aesthetic masonry pizza oven. The invention herein solves this problem.

Figure 3:
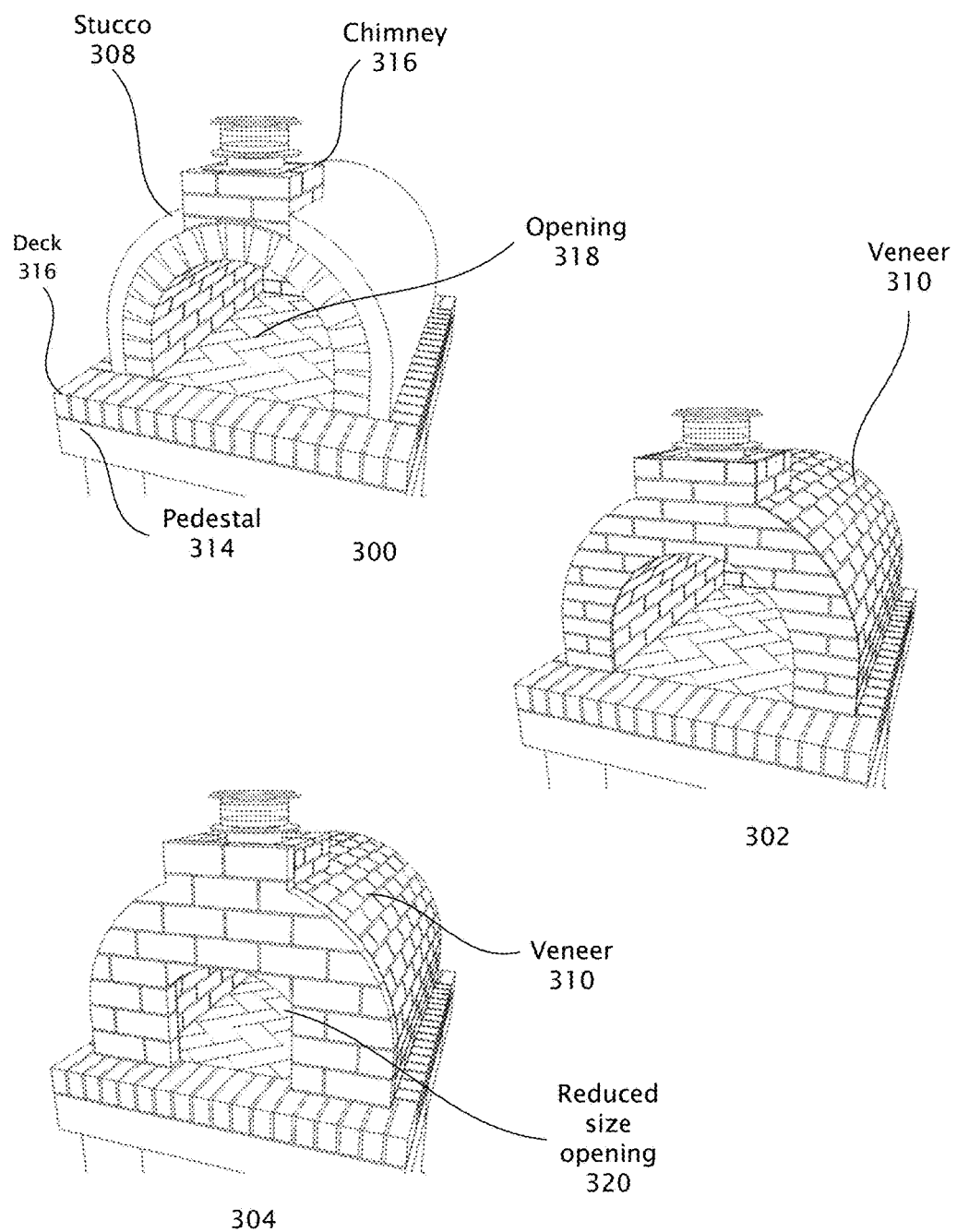
FIG. 3 is a pictorial diagram of a wood fired pizza oven built using the mold and construction process described herein.

FIG. 3 is a pictorial diagram of wood fired pizza ovens built using the molds and construction process described herein. Such an oven style may be called a Mattone Barile style oven. The most basic finished oven 300 is one in which a simple stucco covering 308 has been applied to the assembled oven 306. Other equivalent finishes are possible depending upon taste and the imagination of the homeowner. In particular, veneer material 310 such as stone, brick, or the like, as shown in ovens 302 and 304, may be applied to cover the oven. The oven opening may remain completely open as shown for oven 300 and 302, or optionally, may be somewhat reduced, up to 40% in area as shown for oven 304.

The front opening 318 may be approximately 63% the height of the top of the oven ceiling. If the entrance is too high, heat escapes and is lost, if too low, the oven does not heat completely. Accordingly, an oven built and assembled as described herein allows the opening 318 dimensions to be set in the desired proportions, producing an oven that heats efficiently. A chimney 316 is provided in a set place to help with draft. The construction over a mold provides a solid oven comprised of brick and mortar, very similar to a custom built brick oven.

The oven 306 may be built on top of a masonry (or other suitable material) pedestal 314. The oven is then assembled in place substantially on the pedestal 314, where thermal blanketing (not shown) may be applied over the oven, and a decorative surface 308, 310 may be applied. For additional ornamentation, the exterior of the oven may have a suitable brick veneer, stone veneer, or the like applied to produce virtually any decorative appearance. The chimney 316 is formed using bricks and mortar around the chimney mold components. Also the chimney 316 may be covered with a masonry or stone veneer as well to achieve a desired appearance, and optionally, depending on local building codes, may be topped with a chimney cap or spark arrestor. The opening 318 is where wood and food enters the oven interior. Masonry ovens may have a concrete deck 316 or base inside the oven, that may be concrete, fire brick, or any other material desired that tends to hold and radiate heat.

The masonry oven described herein, due to its on-site construction advantageously traps and radiates heat from a fire, either built within the oven itself or in a firebox, in the same way that a custom built unitary masonry oven does, giving cooking results on par with ovens found in shops and bakeries. In addition, the mold and the construction process tends to make it easy for an untrained home owner, or do-it-yourselfer to construct a pizza oven that looks and performs like a professional mason constructed it, at the fraction of the cost of a custom built oven.

Figure 4:
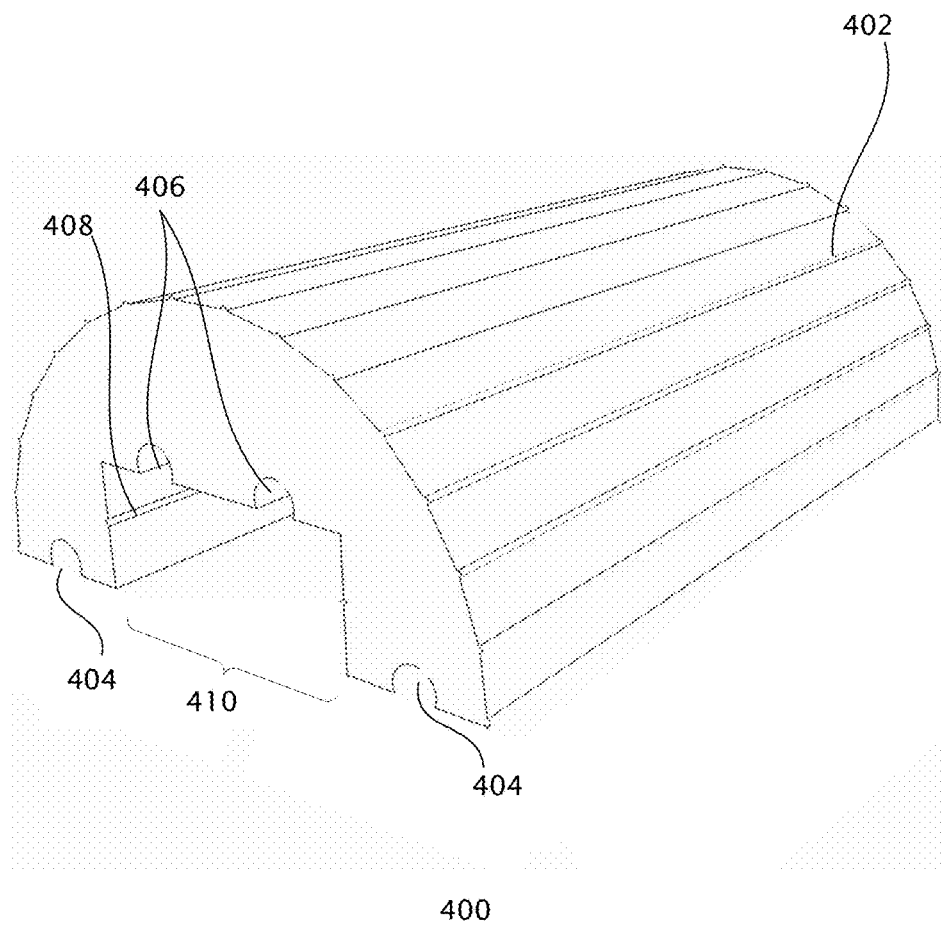
FIG. 4 is a perspective view of the oven top mold component.

FIG. 4 is a perspective view of the oven top mold component. The oven top mold component 400 is advantageously constructed from closed cell foam, or another suitable material, allowing the user to purchase the components with which to construct an oven and easily have them shipped to the job site, as the foam molds are lightweight and easy to transport. This mold component may form the top of the oven cavity and part of the sides. Mold pieces for forming sidewalls (not shown) may be advantageously stored in an interior cavity 410, to aid in transport by forming a more compact shipping package, and the cavity also protects the mold pieces for forming the sidewalls.

Longitudinal ridges 410 disposed on the exterior surface of the top mold component 400 provide guidance to the user for placement of the fire bricks in construction of the pizza oven using the mold and techniques herein described. The ridges as shown generally extend along the length of the oven, and are parallel to each other. The spacing of the ridges may be of any convenient width to accommodate masonry bricks, or blocks of various sizes. The ridges are typically formed to protrude sufficiently so that the bricks are held in place when constructing the oven. The spacing of the ridges over the exterior surface are generally regular, but may be varied to accommodate different sized bricks if desired.

The undersides of the oven top mold, the surface not used to support bricks during construction includes features that aid in shipping the mold set (top mold component 400 and side pieces—not shown). The bottom surface that may be coupled to side mold pieces to be described below is provided with slots, let out areas, grooves or blanks 404 that are formed to interlock with the tab (502 of FIG. 5) on the support legs, or side mold forms (500 of FIG. 5) during construction. These grooves are disposed adjacent to the exterior surface Additional blanks, or voids 406 are disposed in the oven top mold component to receive tabs (502 of FIG. 5) of pieces stored in the interior cavity 410 during shipping and handling of the molds. Additionally, grooves 408 are present within the interior of the oven top mold to receive the longitudinal ridges 504 on the support leg component 500.

Figure 5:
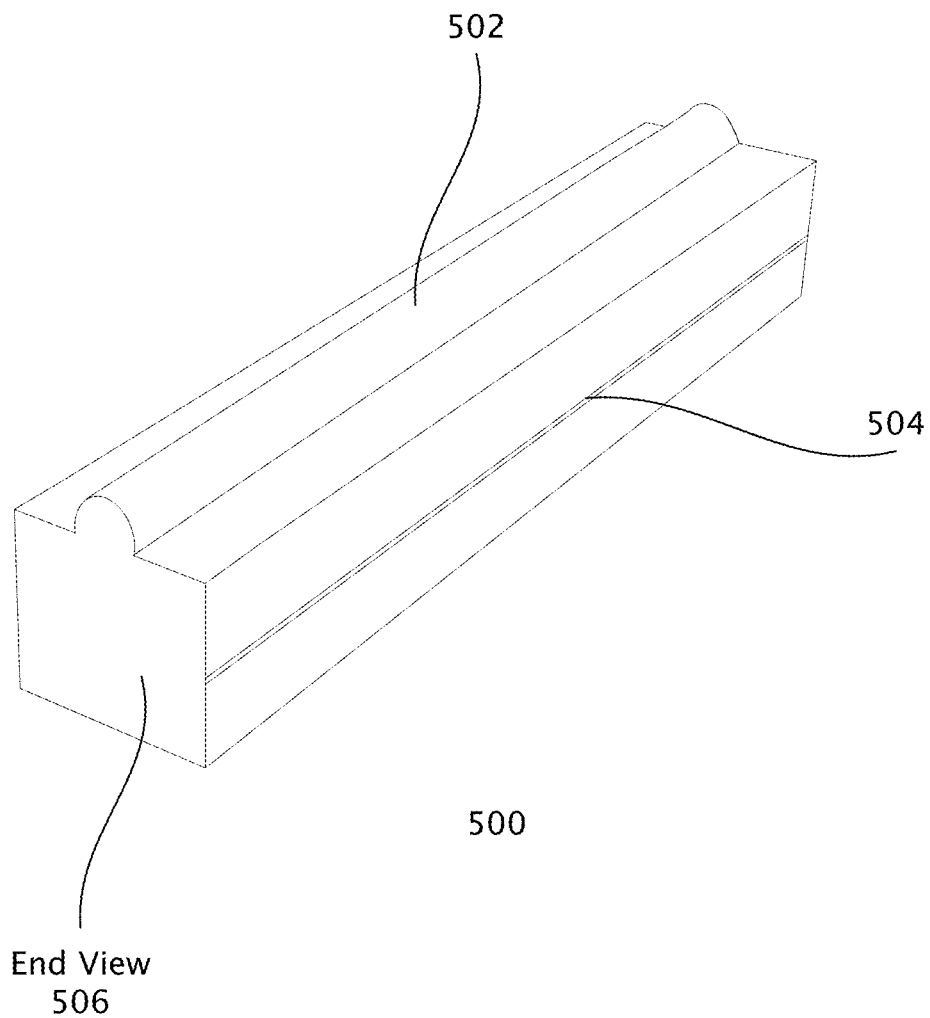
FIG. 5 is a perspective view of the support leg mold components.

FIG. 5 is a perspective view of one of the two support leg mold components 500. A pair of the support leg mold components may be used to hold up the oven top mold component (400 of FIG. 5), and acts as a mold to aid in construction of the sides of the completed oven. The support leg components may be constructed from the same materials as the oven top mold component 400. Two support leg components are used for construction of a wood fired oven using the mold and techniques described herein. The two support leg components are typically identical to each other; one is merely reversed for use on the second side of the oven. The support leg mold components are provided with tabs or interlocking surfaces 502 along the length of the top surface that mate with the blanks (404 and 406 of FIG. 4) of the oven top mold (400 of FIG. 4). Alternatively adhesive paper may be used to supplement joining the pieces, or to replace the interlocking surfaces. One or more longitudinal ridges 504 may be provided on a side that may face the oven exterior where mortar and block may be applied to guide the user in placing the bricks when assembling the oven. Each of the support legs are generally the same length as the oven top mold. Although the end view shows the outline as square from the end, the end view could be rectangular to allow for a lower, or taller oven side height.

Figure 6:
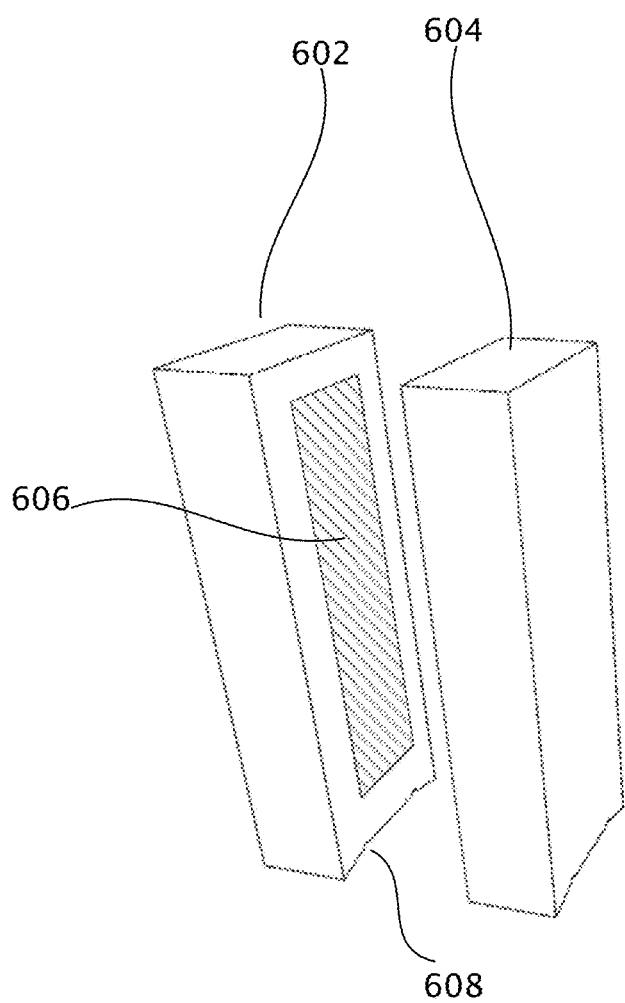
FIG. 6 shows the chimney mold components.

FIG. 6 shows a perspective view of the chimney mold components 602, 604. The chimney mold may be formed from two similar halves 602 and 604. They may be constructed from the same materials as the oven top mold component (400 of FIG. 4). Half 602 has disposed on one surface an adhesive protected by a release paper 606. In use, the release paper is removed and the adhesive binds the halves of the chimney mold together. The chimney mold components are also provided with curvature and grooves 608 along the bottom surface to provide the user guidance in placing the chimney mold on the oven top mold component. These grooves 608 generally match the placement of ridges (402 of FIG. 4) on the top of the oven top mold component (400 of FIG. 4). Alternatively the chimney mold may be formed as a single piece.

Figure 7:
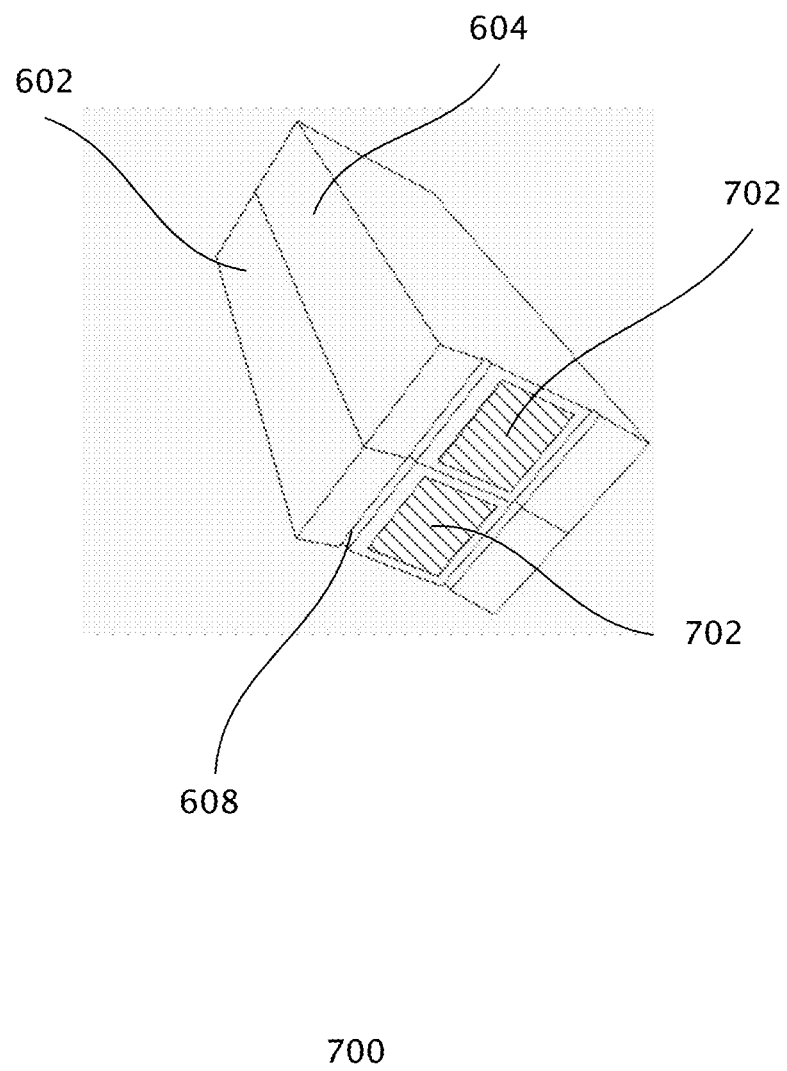
FIG. 7 shows the chimney mold assembly.

FIG. 7 shows a bottom perspective view of the chimney mold assembly 700. Here, the release paper (not shown) on chimney mold half 602 has been removed and the mold half 602 has been adhered to mold half 604. The grooves 608 that provide guidance in placing the chimney mold assembly in the correct location are more clearly visible in this view. The chimney mold assembly is provided with and additional two areas with adhesive protected with release paper 702 to maintain the chimney mold assembly in its correct location during oven construction. Alternatively, rather than adhesive pins or pegs could be employed, or any equivalent joining methods.

Figure 8:
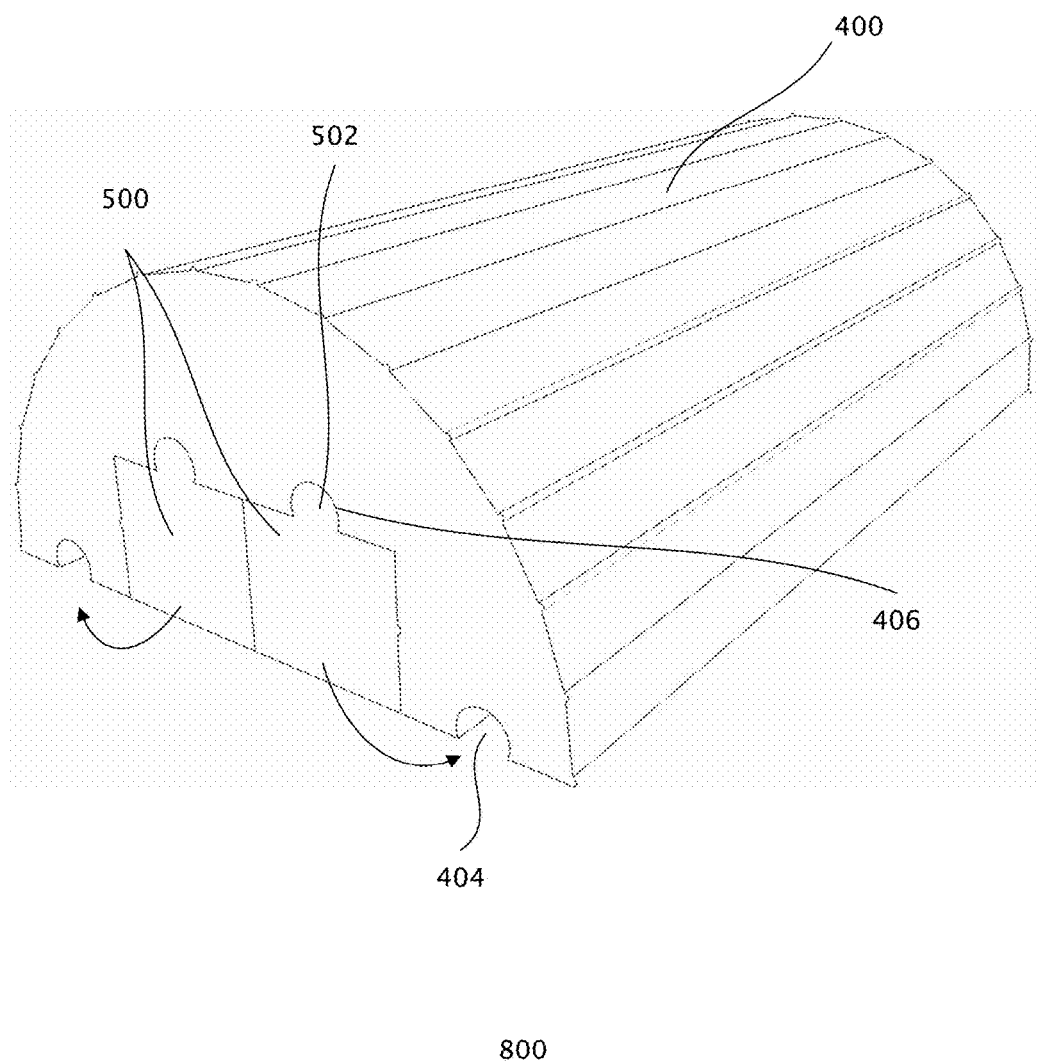
FIG. 8 shows the mold pre-assembly.

FIG. 8 shows a perspective view of the mold pre-assembly 800, such as it might appear when removed from a shipping container. The foam oven mold is designed to be easily shipped and handled, and as such, to facilitate shipping and storage, as well as handling at the job site, of the mold components, the leg support molds 500 can be placed within the cavity of the oven top mold 400, utilizing the tabs 502 and blanks 406 to keep the pieces together. The legs 500 are removed by the user at the construction site and the tabs subsequently placed in the lower blanks 404, as shown by the arrows.

Figure 9:
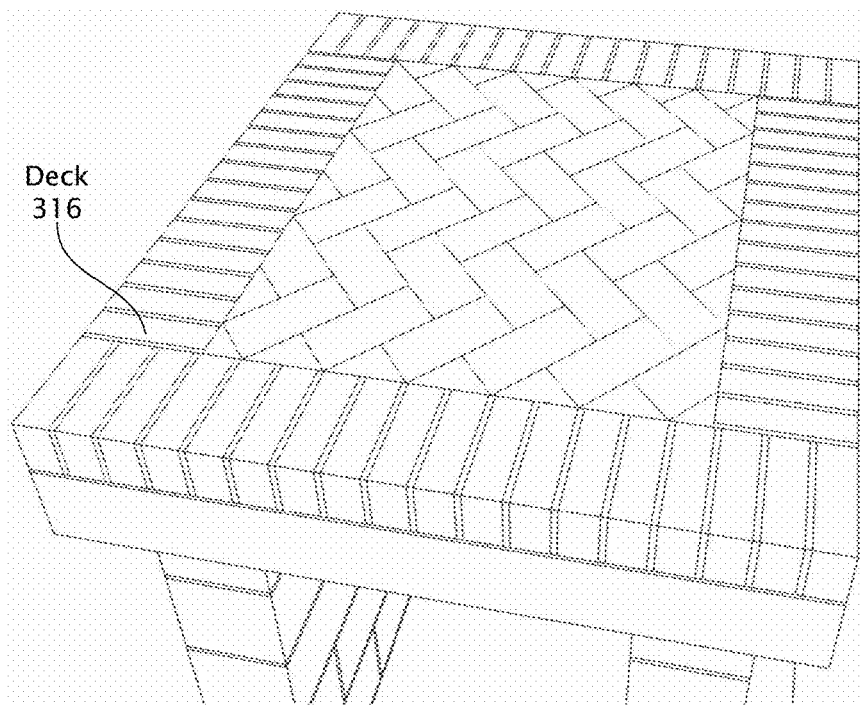
FIG. 9 shows an exemplary pedestal upon which the oven may be assembled.

FIG. 9 shows an exemplary pedestal upon which the oven may be assembled. The pedestal may be constructed by any suitable method, as long as a suitable surface for the deck, or floor, 316 of the oven is provided. The floor may be of concrete, brick, a combination of brick and concrete, or mortar, or equivalent materials that function to retain and distribute heat. Preferably, a conventionally constructed insulated base may be constructed to keep heat from being drawn away from the oven floor. The pedestal may typically be easily constructed by a homeowner, as it typically utilizes vertical, and horizontal surfaces that are easier to construct than the curved surfaces of the oven core. Alternatively the oven may be disposed on a ground level base, or a counter that may be part of an outdoor kitchen arrangement.

Figure 10:
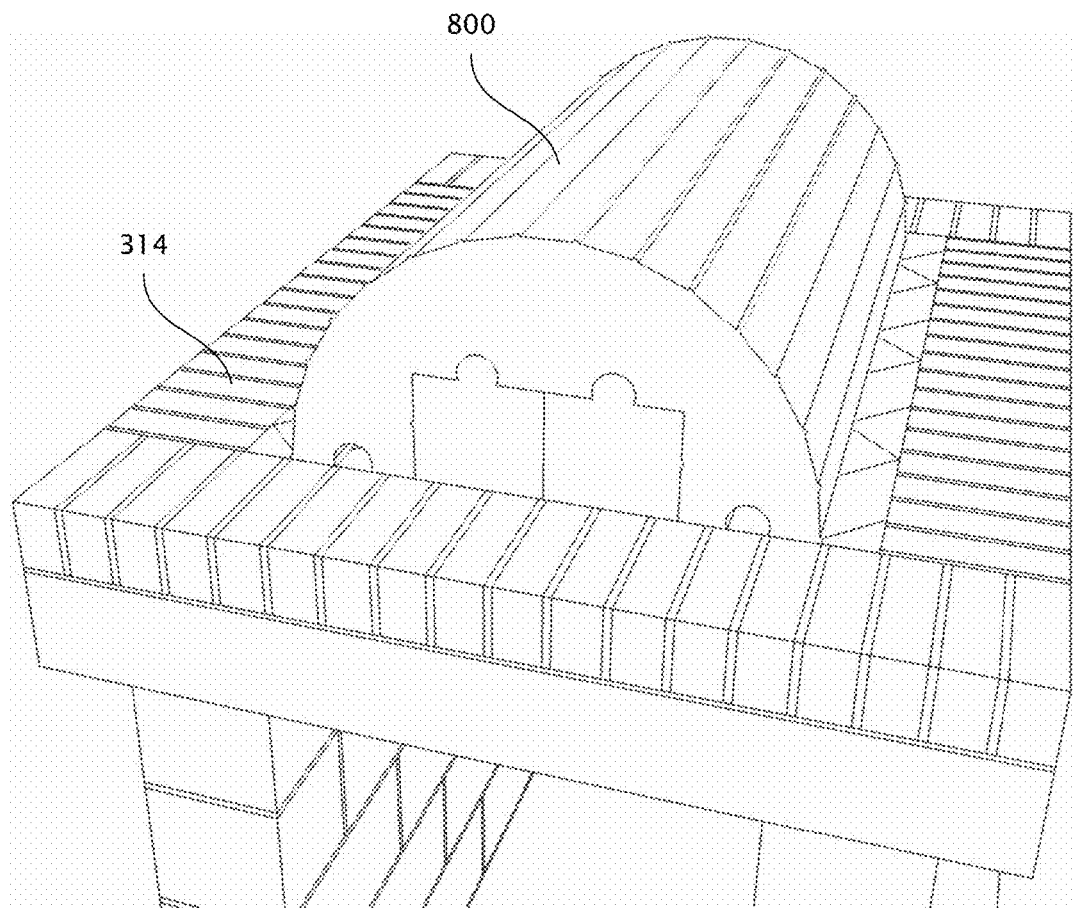
FIG. 10 shows the mold pre-assembly positioned on a pedestal.

FIG. 10 shows the oven mold pre-assembly 800 positioned on a pedestal 314. The oven mold pre-assembly is positioned in the desired position on the pedestal prior to constructing the oven core. The location is marked on the pedestal for future reference.

Figure 11:
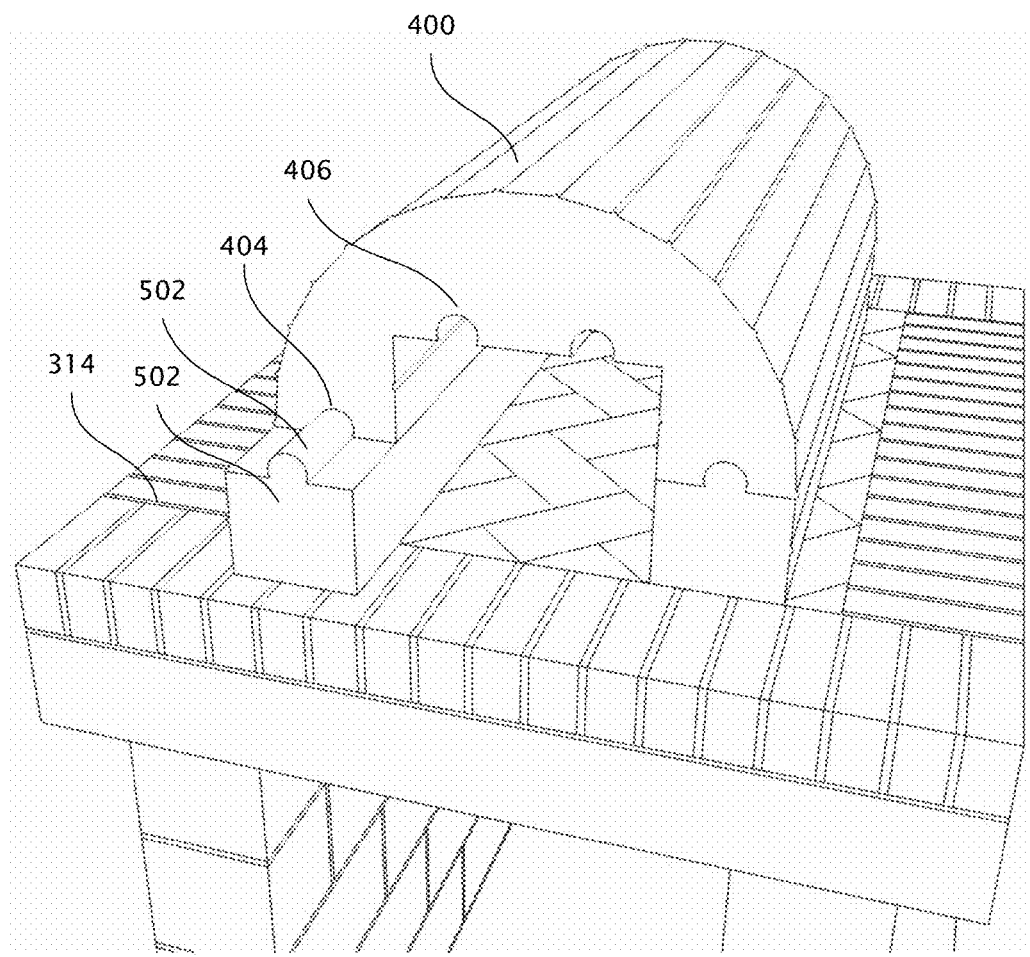
FIG. 11 shows the oven mold assembly positioned on the pedestal.

FIG. 11 shows the oven mold assembly 1100 positioned on the pedestal 314. The support legs 502 have been removed from the interior cavity of the oven top 400 and replaced underneath the sides of the oven top. The tabs 502 are relocated to blanks 404 and the end faces aligned. The oven mold assembly is placed on the pedestal using the locating marks previously created.

Figure 12:
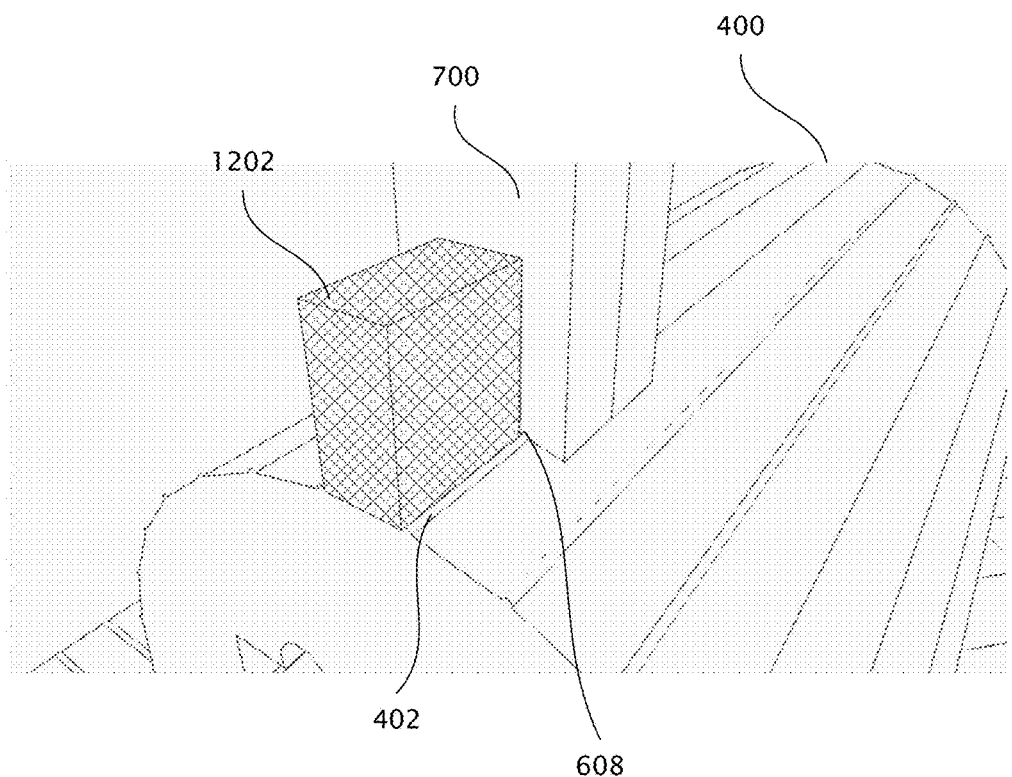
FIG. 12 shows the chimney mold assembly and positioning on the oven mold assembly.

FIG. 12 shows the chimney mold assembly and its positioning on the oven mold assembly. The chimney foam mold assembly 700 is placed near the front of the oven on the top of the oven mold top 400. Prior to placement, the release paper protecting the adhesive on the bottom of the chimney mold assembly is removed (not shown), and the chimney mold assembly placed back from the front opening of the oven using a firebrick 1202 as a spacer. The grooves in the bottom of the chimney mold assembly 608 engage the ridges 402 on the oven top mold 400. Once the chimney mold assembly is positioned, the firebrick 1202 is removed.

Figure 13:
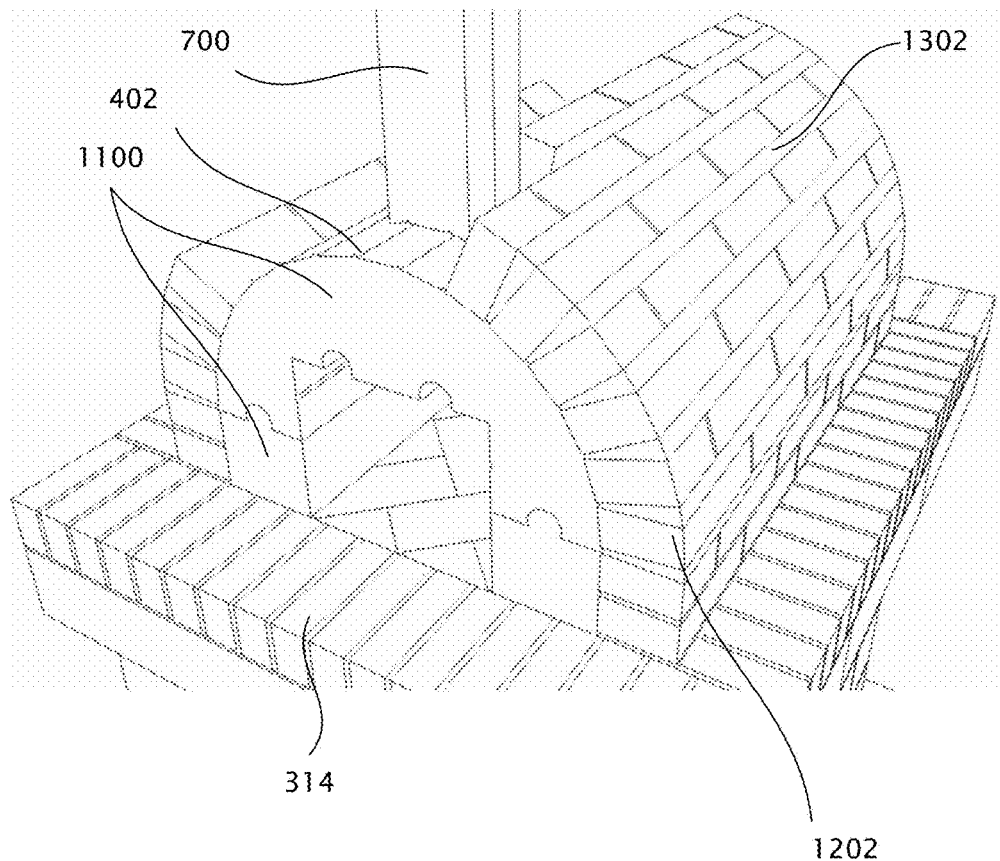
FIG. 13 shows placement of bricks and mortar to the outer surface of the mold assembly.

FIG. 13 shows placement of bricks and mortar to the outer surface of the oven mold assembly 1100. Fire bricks 1202 are placed on the outer surface of the oven mold assembly 1100, beginning at the bottom edge in contact with the pedestal 314 at the rear of the oven mold assembly. High temperature mortar 1302 is applied to the bottom of a bisected fire brick and place firmly against the foam mold and on the pedestal. The bottom layer is completed using full fire bricks and high temperature mortar. The fire bricks are not mortared to the foam mold assembly, rather to the pedestal 314 and to each other.

Subsequent rows of fire bricks are staggered so that the vertical mortar joints are offset. The ridges 402 on the outer surface of the oven mold assembly are used to guide appropriate positioning of the fire bricks and mortar. Fire bricks 1202 and high temperature mortar 1302 are applied until the chimney mold assembly 700 is reached.

Figure 14:
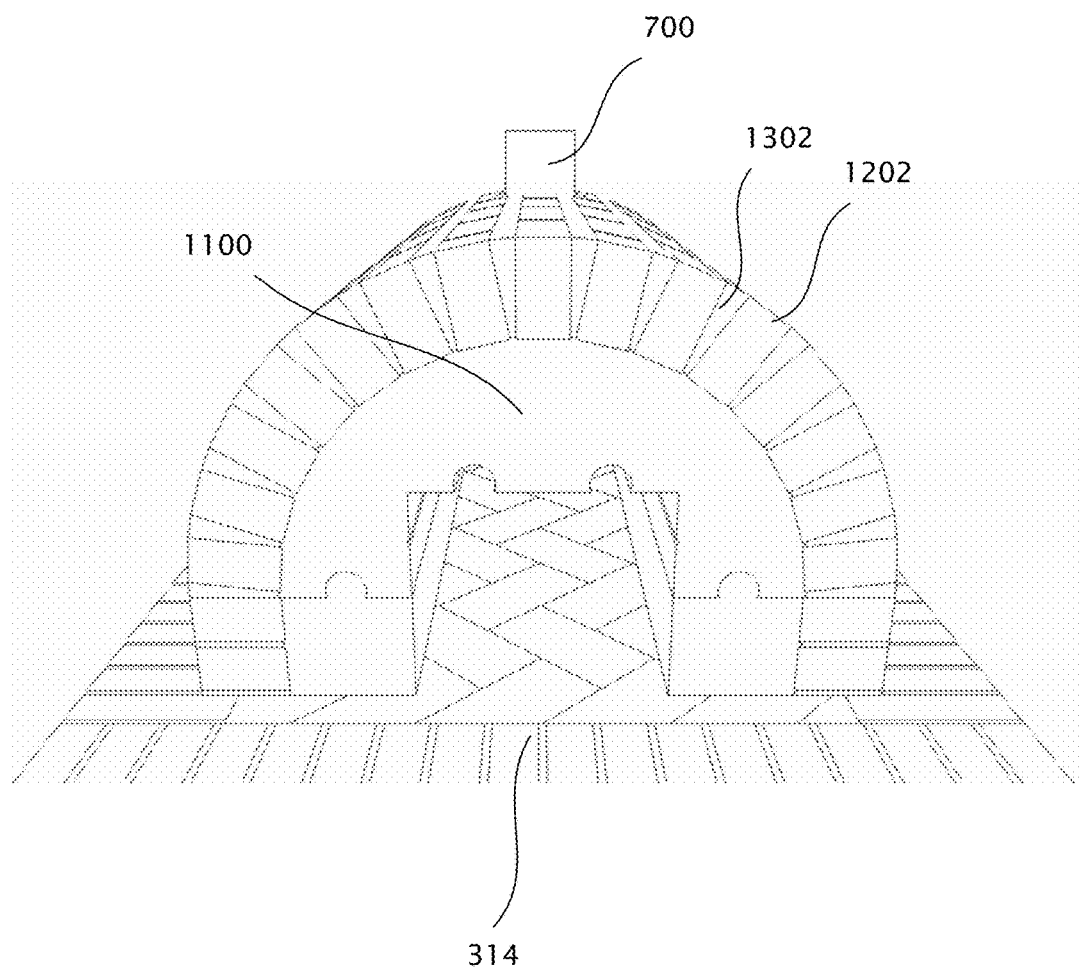
FIG. 14 shows a rear view of the oven with bricks and mortar over the top and sides.

FIG. 14 shows a rear view of the oven with bricks 1202 and mortar 1302 over the top and sides of the foam oven mold assembly 1100.

Figure 15:
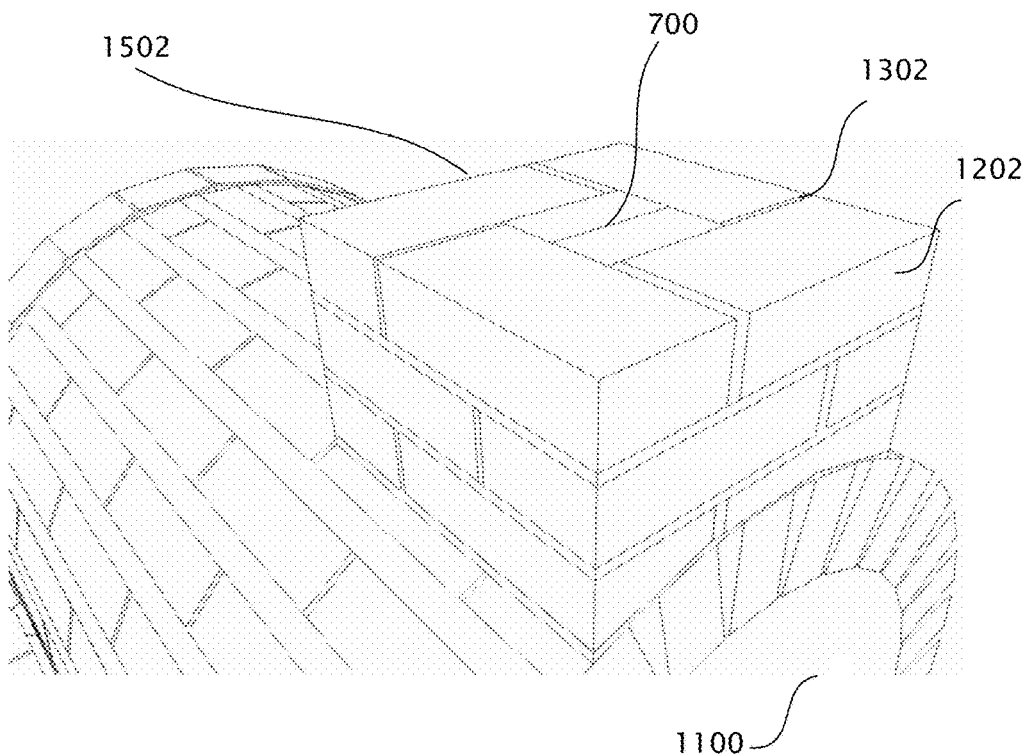
FIG. 15 shows placement of bricks and mortar to form the chimney.

FIG. 15 shows placement of bricks 1202 and mortar 1302 to form the chimney 1502. Not shown are bricks trimmed to fit around the chimney mold assembly 700 and the oven mold assembly 1100 at the base of the chimney to provide a flat surface upon which to form the chimney 1502.

Figure 16:
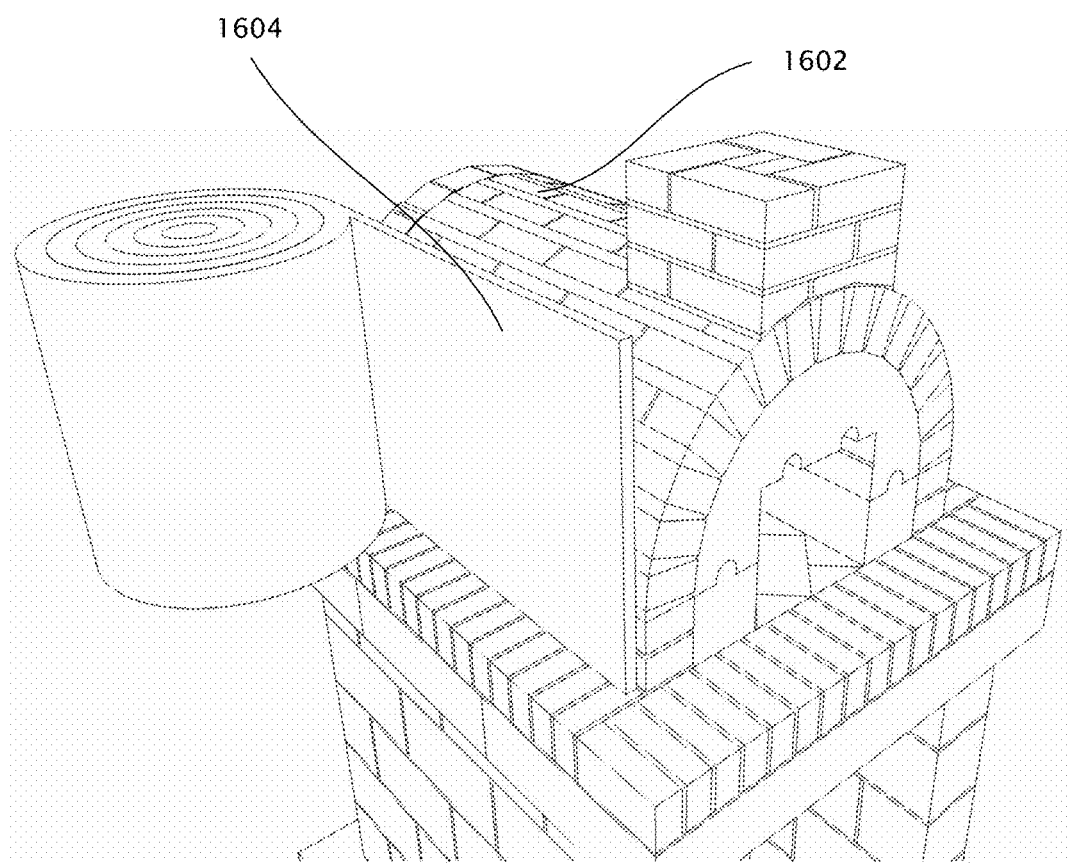
FIG. 16 shows the placement of insulative material to the oven.

FIG. 16 shows the placement of insulative material 1604 to the oven outer surface 1602. The insulative material aids in heat retention, and keeps the exterior of the oven cooler. Conventional one inch (or equivalent) fiberglass batting without a paper backing may be utilized, or ceramic fiber blanket, or similar, in one layer to cover the oven outer surface. An additional exemplary two additional layers may be disposed to cover the oven, except for the front, where the opening in the oven is located. Installation of the insulative material 1604 over the oven outer surface 1602, is shown in its initial placement prior to fitting to the oven.

Figure 17:
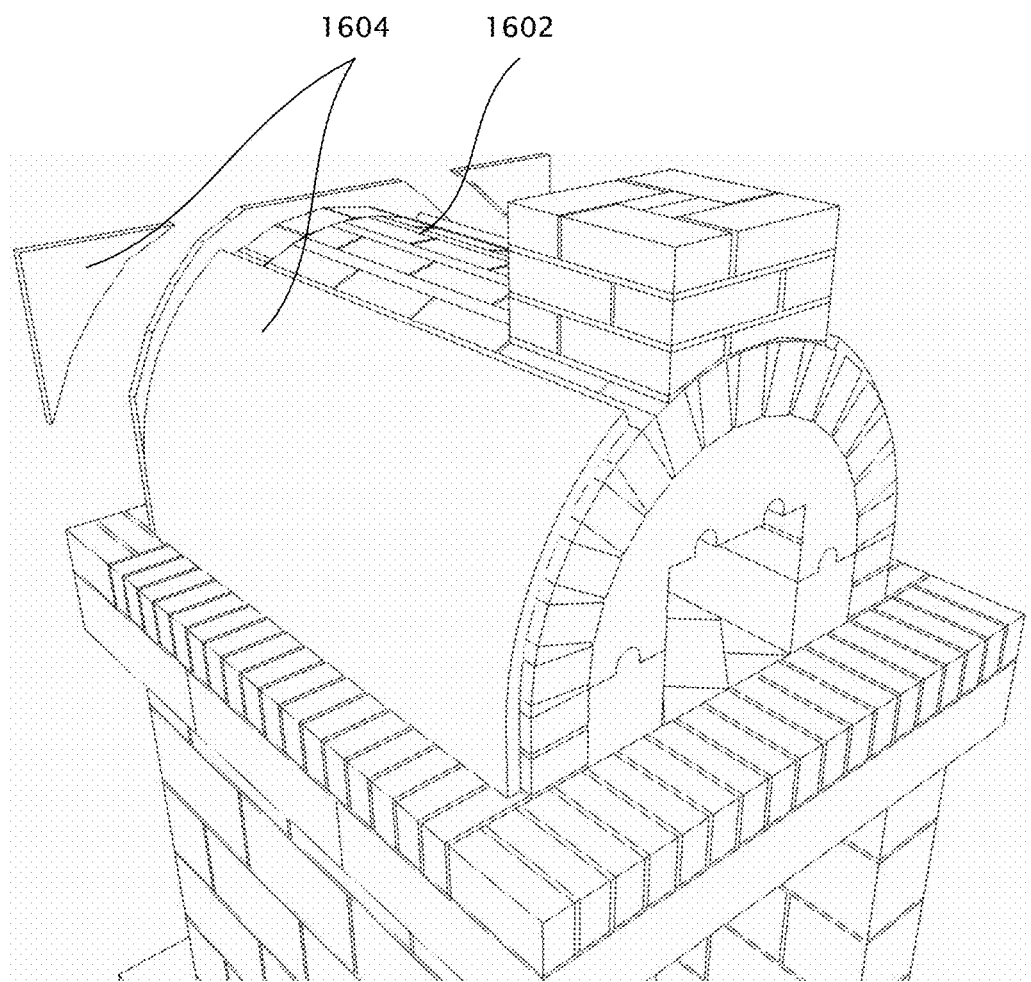
FIG. 17 shows the trimming of insulative material applied to the oven.

FIG. 17 shows the trimming of insulative material 1604 applied to the oven outer surface 1602. Shears may be used to trim the insulation blanket 1306 so that it fits closely against the assembled oven. In alternative examples, a precut insulation blanket may be used.

Figure 18:
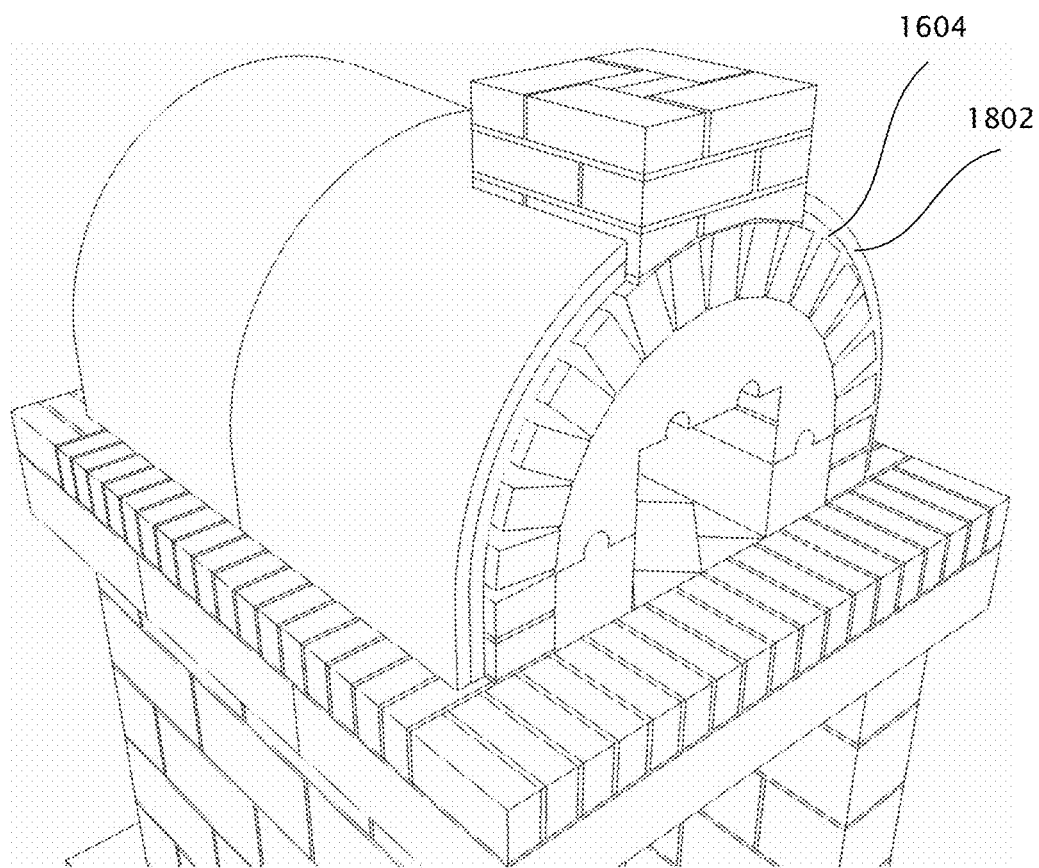
FIG. 18 shows the final placement of insulative material to the oven.

FIG. 18 shows the final placement of insulative material 1604 to the oven, with the exemplary addition of supplemental layers 1802 of insulative material. Additional layers 1802 of insulation applied to the oven core provide optional improvement in heat retention within the oven and improved maintenance of a cooler exterior.

Figure 19:
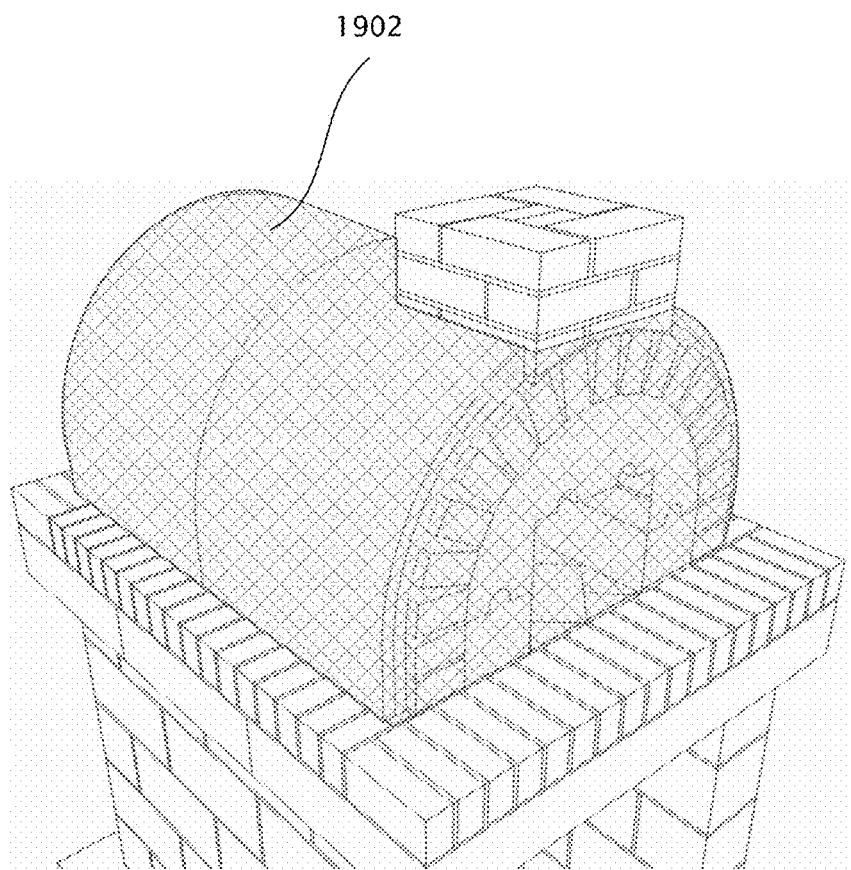
FIG. 19 shows application of metal lath to the outer surface of the oven.

FIG. 19 shows application of metal lath, or wire netting to the outer surface of the insulated oven. The metal lath 1902 is installed prior to application of a masonry covering. The metal lath keeps the insulation in place and provides a support structure for a final masonry coating. The metal lath covers the front opening of the oven and is trimmed after application of a masonry coating.

Figure 20:
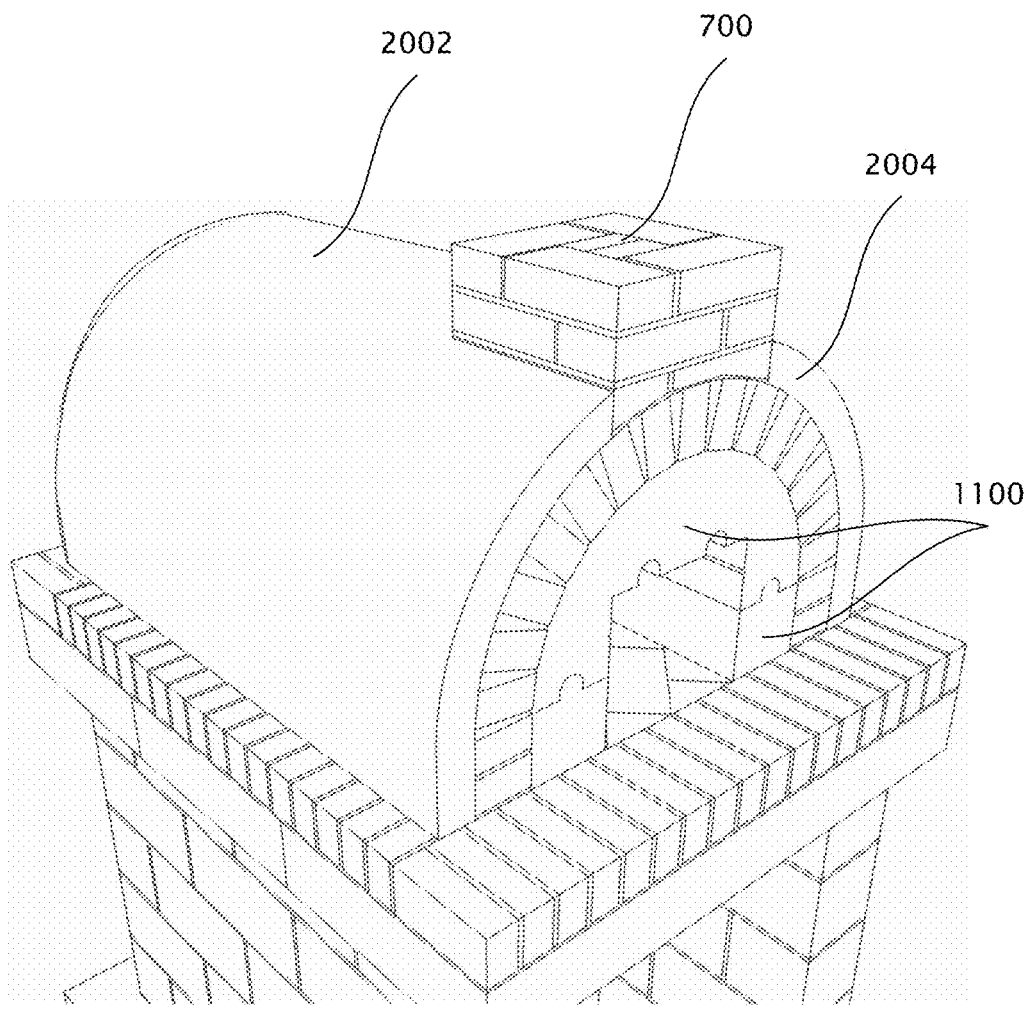
FIG. 20 shows a front perspective view of the oven with a stucco coating applied over the metal lath.

FIG. 20 shows a front perspective view of the oven with a stucco or other masonry coating applied over the metal lath. The masonry coating 2002 covers the oven body and the masonry 2004 is extended onto the front of the oven to cover the insulation. Once the stucco or other coating has cured, the metal lath is trimmed from the front opening close to the edge of the coating. Once the metal lath is trimmed, the foam oven mold assembly 1100 and chimney mold assembly 700 can be removed from the oven core by sliding the pieces out through the front opening and the chimney top (not shown).

Figure 21:
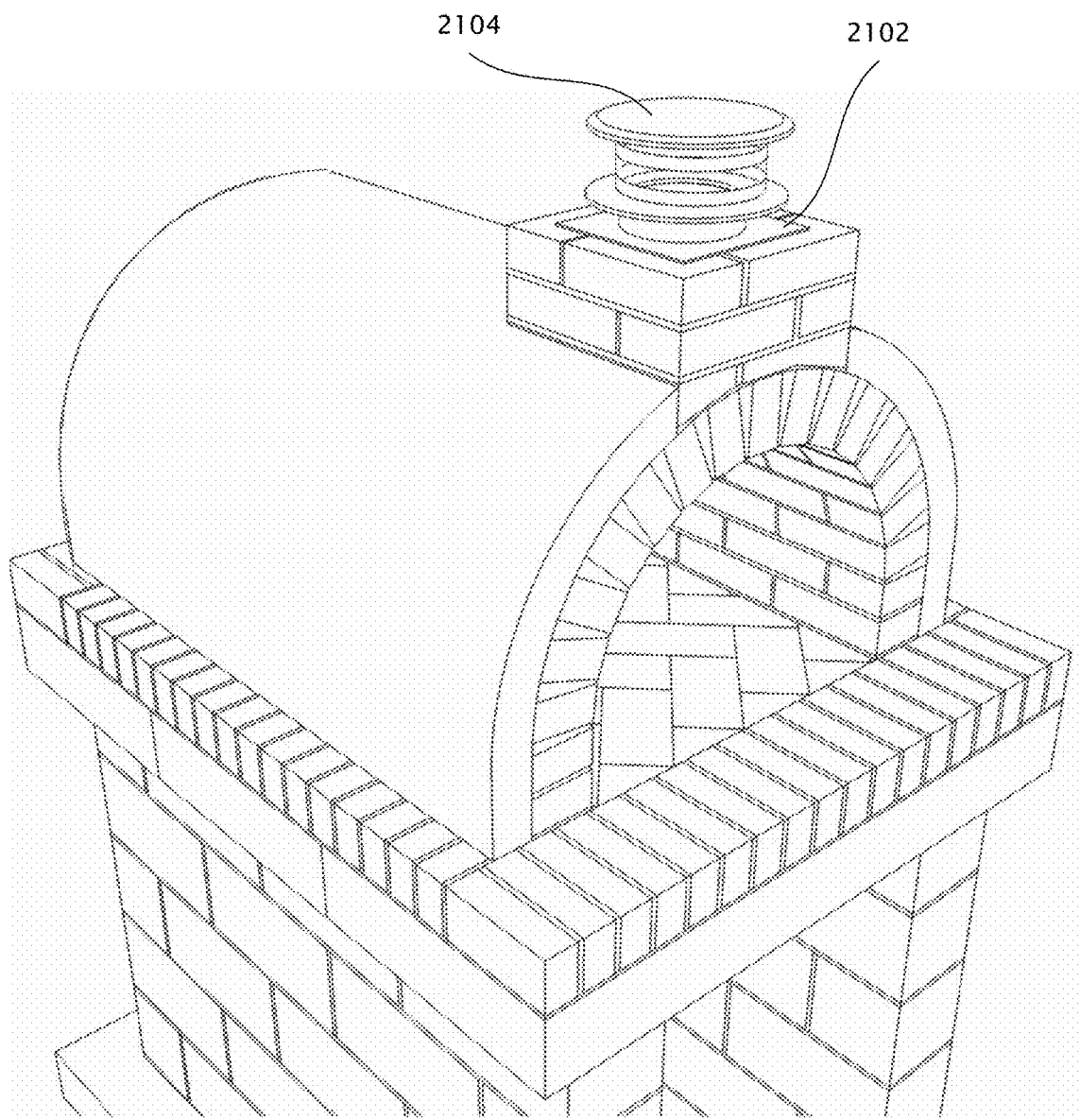
FIG. 21 shows the installed anchor plate and chimney cap to the chimney.

FIG. 21 shows the installed anchor plate and chimney cap to the chimney. The anchor plate 2102 and chimney cap 2104 shown are exemplary and their requirement is dependent on local laws and codes. Heat resistant adhesive, such as heat resistant silicone adhesive, or the like, is applied to the bottom of the anchor plate 2102. The anchor plate with adhesive is centered over the chimney opening and pressed firmly onto the chimney. The chimney cap 2104 is subsequently attached onto the anchor plate.

Figure 22:
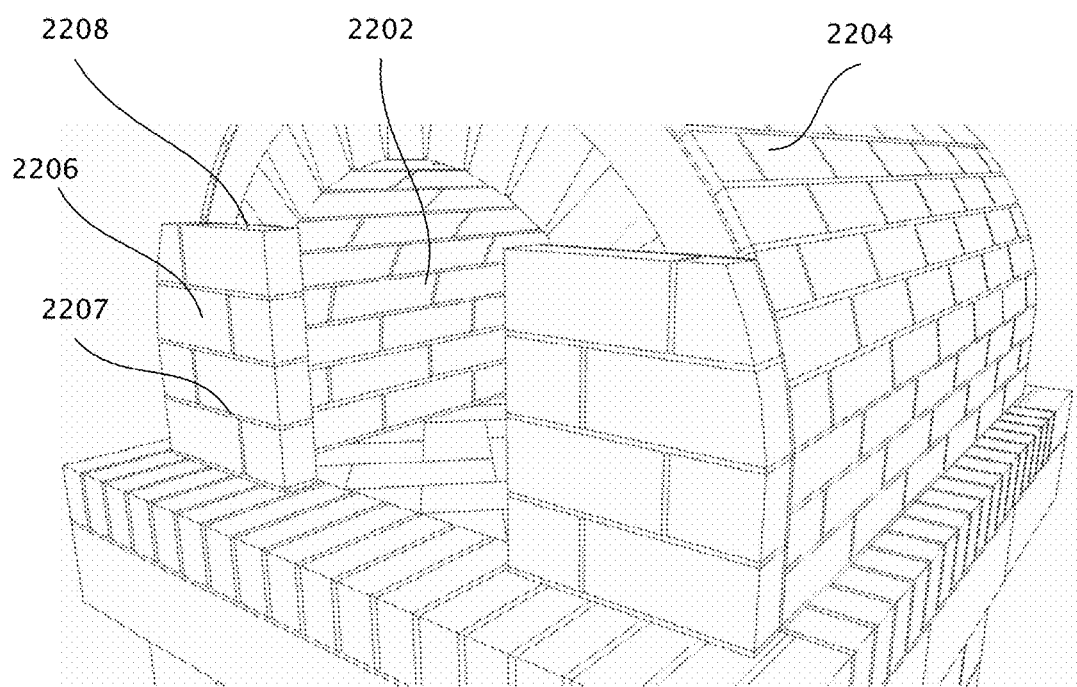
FIG. 22 shows optional area reduction of the oven opening.

FIG. 22 shows a front perspective view of an oven with optional area reduction of the front opening in progress. Optionally, the front opening 2202 of the oven may be decreased in area up to 40% to improve heat retention. Bricks 2206 and high temperature mortar 2207 are placed at the oven front to the desired height. Angle iron (not shown) is placed upon the flat surface 2208 created by the top layer of bricks to provide a ledger for support for the subsequent bricks applied to finish the opening.

Figure 23:
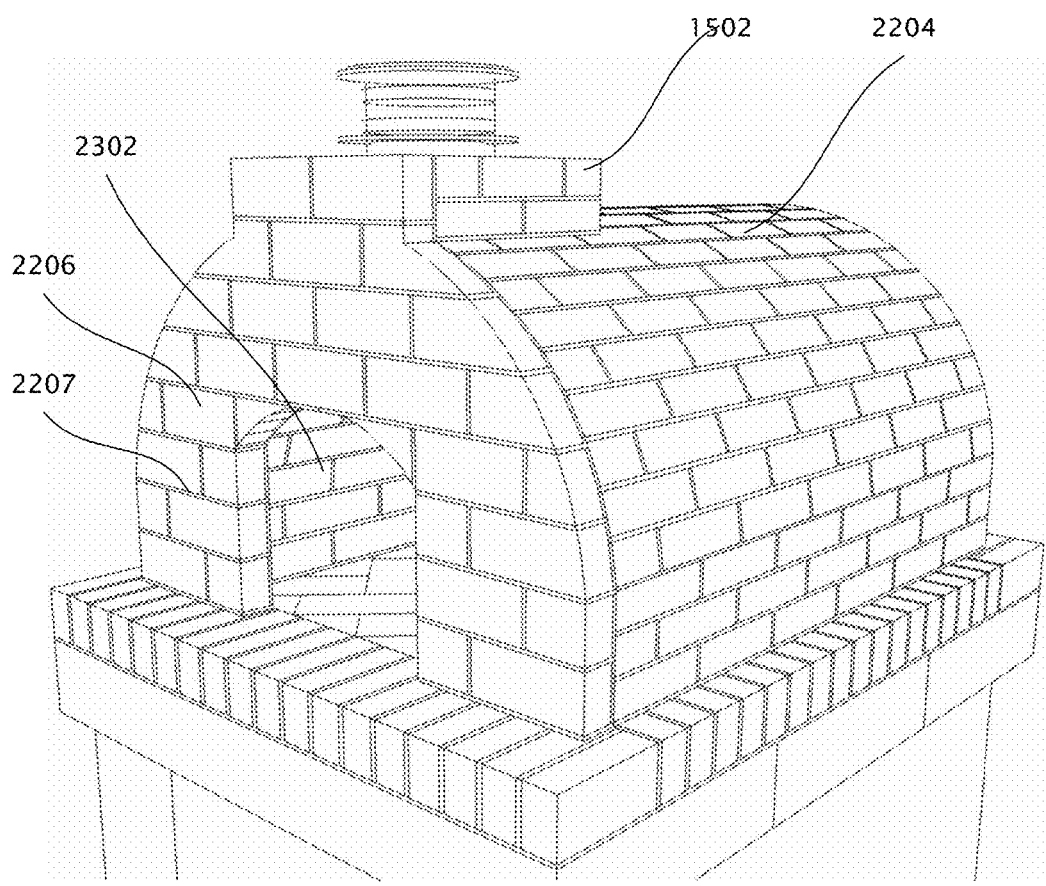
FIG. 23 shows a front perspective view of an oven with optional area reduction of the front opening.

FIG. 23 shows a front perspective view of an oven with a completed optional area reduction of the front opening. The fire bricks 2206 and high temperature mortar 2207 have been place on top of the angle iron (not shown) and the placement of bricks and mortar continued along the front of the oven and chimney 1502 to create a pleasing appearance.

Figure 24:
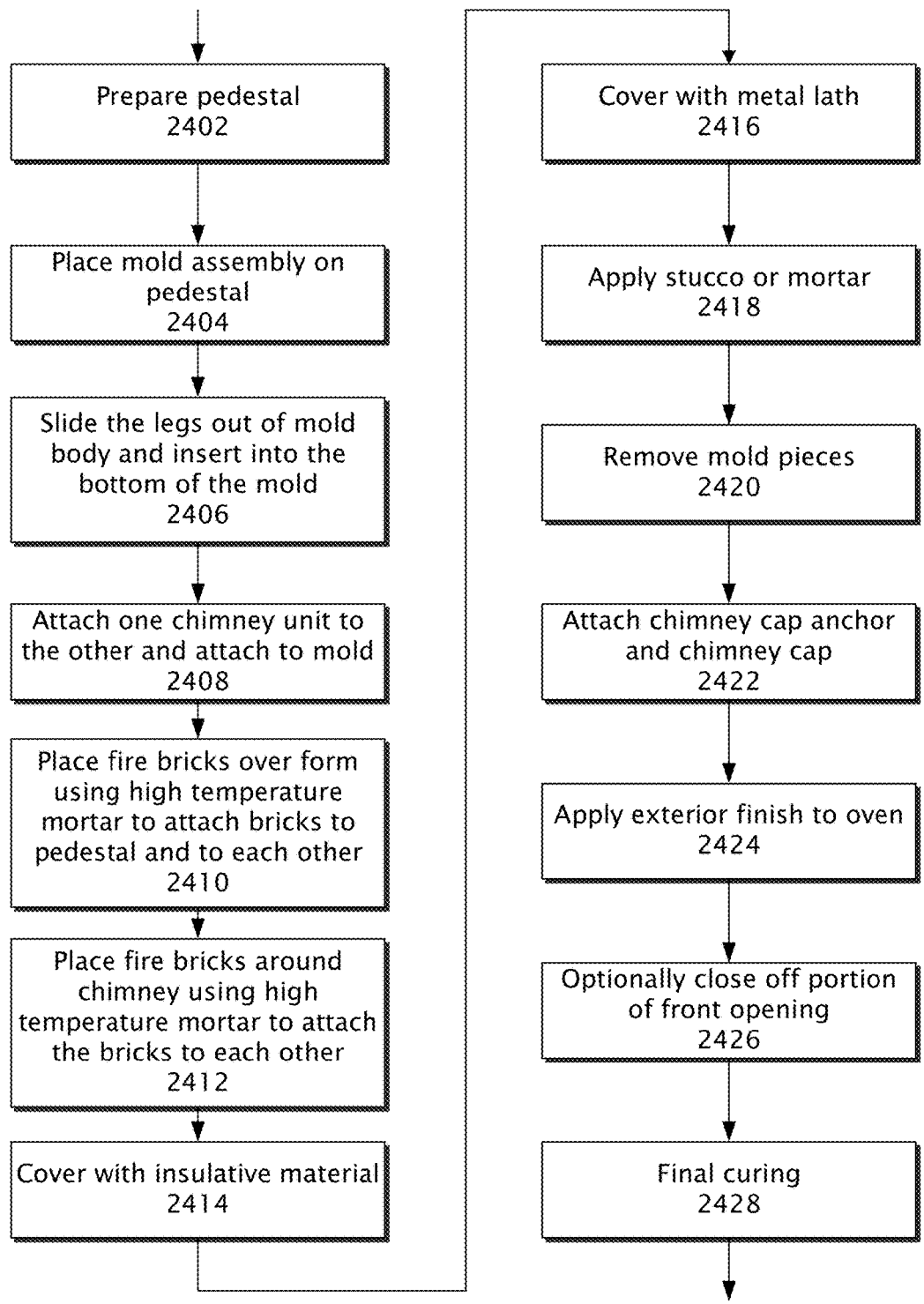
FIG. 24 is a flow diagram showing the process of oven construction.

FIG. 24 is a flow diagram showing the process of oven construction. The process is a summary of that previously illustrated in FIGS. 9-23. At block 2402, the pedestal upon which the oven may ultimately reside is constructed. At block 2404, the foam oven mold preassembly may be placed on the pedestal and centered. At block 2406, the legs of the mold are removed from the oven center and placed under the oven top mold, interlocking the tabs on the legs with the blanks on the oven top. At block 2408, the chimney mold pieces are assembled to form the chimney mold, and the chimney mold placed on the oven mold assembly. At block 2410, high temperature mortar may be used to attach fire bricks to the pedestal and to one another over the oven mold assembly. Fire bricks and high temperature mortar are placed around the chimney mold assembly to form the chimney at block 2412. At block 2414, the insulative material may be placed over the masonry and trimmed to fit. Optionally, additional layers of insulation may be installed. At block 2416, the metal lath that holds the insulation in place and provides support for the subsequently applied masonry coating may be applied to cover the oven. At block 2418, stucco or mortar may be applied to the metal lath. Once the applied masonry is cured, the metal lath may be trimmed close to the masonry. At block 2420, the foam oven mold assembly pieces are removed from the oven by sliding them out through the front opening. The chimney mold assembly may be removed by sliding it out the top of the chimney. At block 2422, the chimney cap anchor plate and chimney cap are optionally attached to the chimney. Block 2424 provides for application of a decorative exterior finish, such as brick veneer, rock veneer, or the like. At block 2426, the front opening of the oven optionally may be closed off up to 40% to improve heat retention. At block 2428, the final curing of the oven occurs, after which the oven is ready to be fired and used for cooking.

Figure 25:
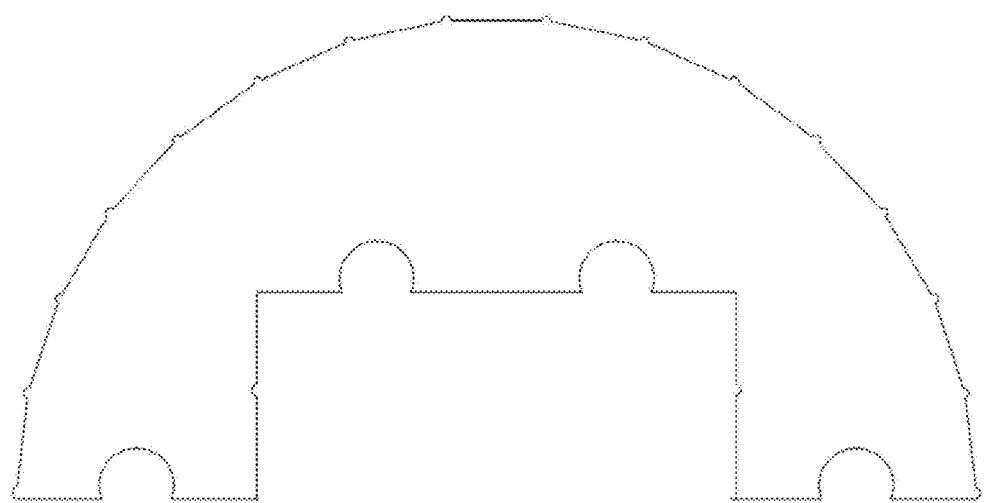
FIG. 25 is an end on view of an oven top mold.
Figure 26:
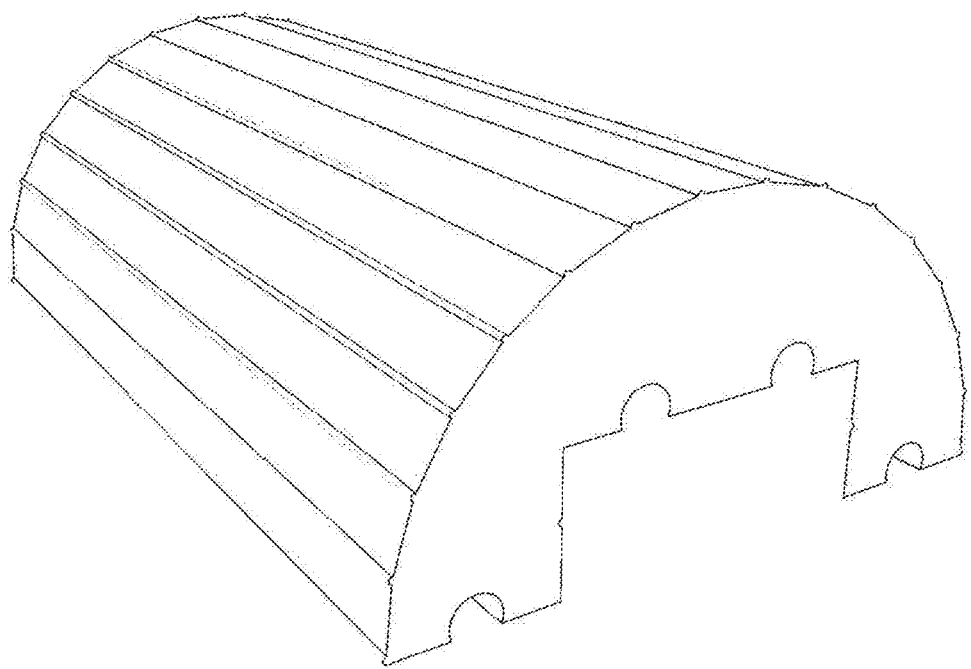
FIG. 26 is a perspective view of an oven top mold.
Figure 27:
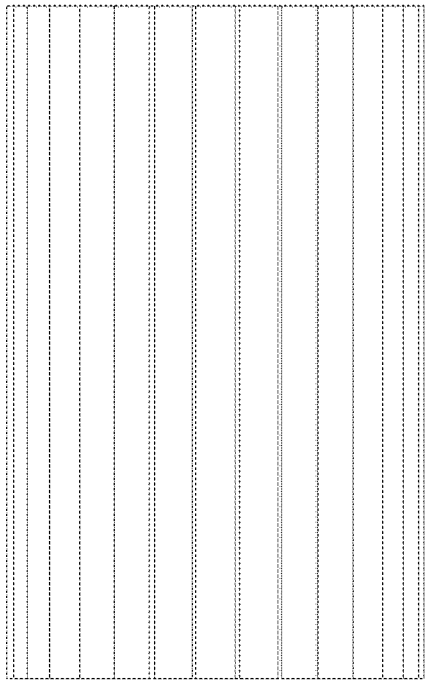
FIG. 27 is a top view of an oven top mold.
Figure 28:
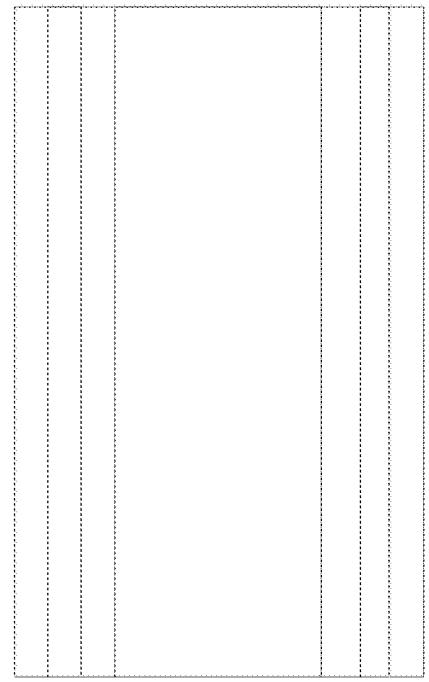
FIG. 28 is a bottom view of an oven top mold.
Figure 29:
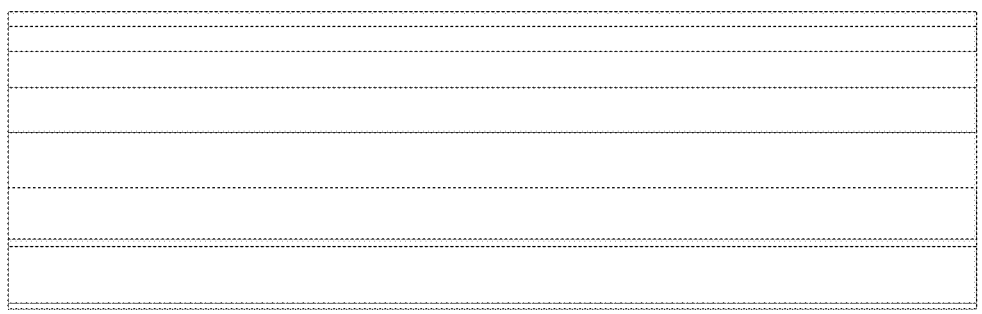
FIG. 29 is a side view of an oven top mold. R and I same
Figure 30:
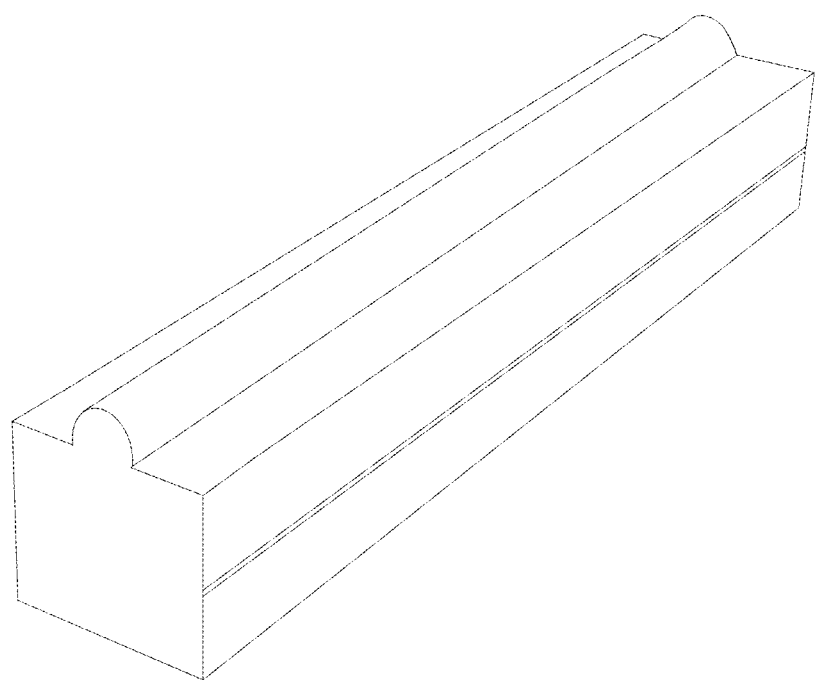
FIG. 30 is a perspective view of a support leg mold.
Figure 31:
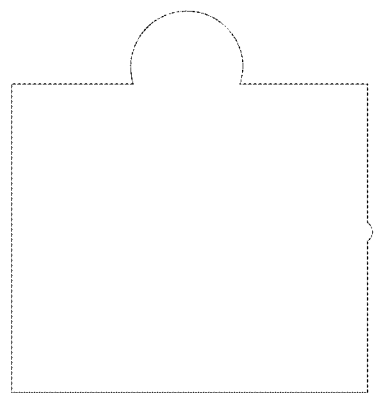
FIG. 31 is an end on view of a support leg mold.
Figure 32:
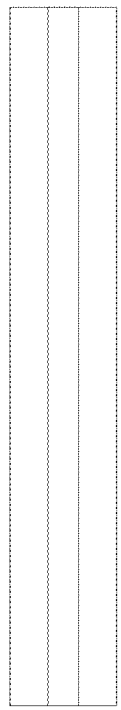
FIG. 32 is a top view of a support leg mold.
Figure 33:
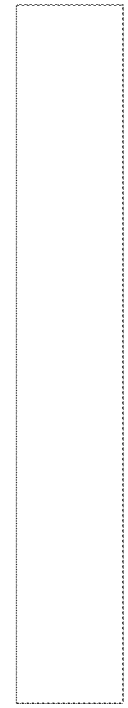
FIG. 33 is a bottom view of a support leg mold.
Figure 34:
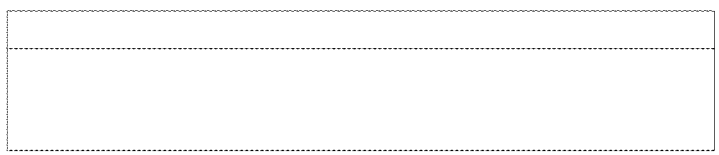
FIG. 34 is a right view of a support leg mold.
Figure 35:
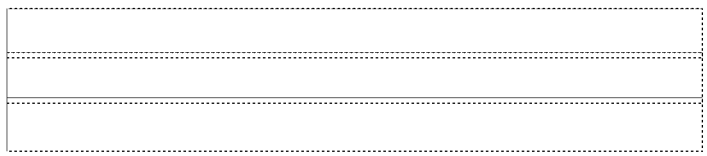
FIG. 35 is a left view of a support leg mold.

FIG. 25 is an end on view of an oven top mold.
FIG. 26 is a perspective view of an oven top mold.
FIG. 27 is a top view of an oven top mold.
FIG. 28 is a bottom view of an oven top mold.
FIG. 29 is a side view of an oven top mold. R and I same
FIG. 30 is a perspective view of a support leg mold.
FIG. 31 is an end on view of a support leg mold.
FIG. 32 is a top view of a support leg mold.
FIG. 33 is a bottom view of a support leg mold.
FIG. 34 is a right view of a support leg mold.
FIG. 35 is a left view of a support leg mold.
FIG. 36 is the inner surface of the chimney mold with adhesive.
FIG. 37 is the inner surface of the chimney mold without adhesive.
FIG. 38 is the obverse surface of both chimney molds.
FIG. 39 is the side view of the chimney molds.
FIG. 40 is the top view of the chimney molds.
FIG. 41 is the bottom view of the chimney molds.

Like reference numerals are used to designate like parts in the accompanying drawings.

In FIGS. 25-41, any broken lines present are indicative of environmental structure in the drawing and are not part of the design sought to be patented.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A single use fixed size masonry pizza oven disposable form set formed from foam, comprising:
    an oven top mold piece made from foam providing a surface for forming an oven top being constructed over the oven top mold piece from brick;
    a first side panel first piece made from foam providing a surface for use in forming a first oven side by laying brick with mortar joints against the first side panel mold piece;
    a second side panel mold piece made from foam providing a second surface for forming a second oven side by laying brick with mortar joints against the second side panel mold piece; and
    a chimney mold piece made from two foam pieces coupled together adhesively providing a surface for forming an oven chimney by encircling the chimney mold piece with mortared bricks during construction so that the chimney mold piece is in an interior of a chimney formed;
    whereby the first side panel mold piece and second side panel mold piece are sized to fit in a cavity in the oven top mold piece for compact storage during shipping, until set up for use, whereupon interlocking ridges and matching grooves between the first side panel mold piece and the oven top mold piece and the second side panel mold piece and the oven top mold piece grooves and ridges are engaged when assembled with the oven top mold piece assembled sitting on top of the first side panel mold piece and the second side panel mold piece with the grooves and ridges engaged to form a mold core, and the chimney mold piece is coupled to a top surface of the oven top mold piece to define a chimney opening and about which the masonry pizza oven is constructed by the laying mortared bricks against an exterior surface of the form set, the form set guiding the laying of the bricks, and when cured, removing the form set by destructively breaking up the form set for removal from the oven cavity formed, and subsequent disposal, wherein the oven top mold piece for forming the oven top and the first and the second side panel mold pieces each includes longitudinal ridges protruding and spaced to aid in alignment and placement of masonry.

2. The masonry pizza oven form set of claim 1, in which the mold material is closed cell foam.

3. The masonry pizza oven form set of claim 1, in which the oven top mold piece for forming the oven top has voids to receive tabs on the oven side panel molds.

4. The masonry pizza oven form set of claim 3, in which the oven top mold piece for forming the oven top has a second set of voids within an interior of the mold for receiving said tabs on the oven side panel molds.

5. A single use nesting foam form set amenable to shipping for aiding a mortared lay up of bricks in constructing a pizza oven comprising:
- a half cylinder piece made from foam of length, having an outer surface with longitudinal ridges disposed thereon to accommodate the mortared lay up of bricks against the outer surface, a rectangular opening of width and height, disposed along a long axis of the half cylinder piece, wherein the longitudinal ridges are protruding and spaced to aid in alignment and placement of the mortared lay up of bricks;
- a first rectangular piece made from foam of length, and a width to accommodate the mortared lay up of bricks against the outer surface to form a first vertical oven side;
- a second rectangular piece made from foam of length, and a width to accommodate the mortared lay up of bricks against the outer surface to form a second vertical oven side; and whereby the first rectangular piece and the second rectangular piece are stored in the rectangular opening for shipping, and whereby the lay up of mortared bricks against the half cylinder piece, the first rectangular piece, and the second rectangular piece forms a brick pizza oven when the half cylinder piece, the first rectangular piece, and the second rectangular piece supporting the laid up bricks is removed from finished oven by breaking up into the half cylinder piece, the first rectangular piece, and the second rectangular piece.

6. A form set for aiding the lay up of brickwork in constructing a pizza oven of claim 5, in which the half cylinder piece is set upon the first rectangular piece and the second rectangular piece after removal from rectangular opening.

7. A form set for aiding the lay up of brickwork in constructing a pizza oven of claim 6 further comprising;
- a first longitudinal ridge disposed on a longitudinal surface of the first rectangular piece;
- a second longitudinal ridge disposed on a longitudinal surface of the first rectangular piece;
- a first longitudinal grove disposed in a flat exterior surface of the half cylinder piece;
- a second longitudinal grove disposed in a flat exterior surface of the half cylinder piece;
- whereby the first longitudinal grove of the half cylinder piece rests on the ridge of the first rectangular piece;
- whereby the second longitudinal grove of the half cylinder piece rests on the ridge of the second rectangular piece; and
- whereby interlocking of the grooves, and ridges tends to stabilize the assembled form set when mortared bricks are laid up against it.

8. A form set for aiding the lay up of brickwork in constructing a pizza oven of claim 6 in which the mold material is closed cell foam.

* * * * *